United States Patent [19]

Banning et al.

[11] Patent Number: 5,421,008
[45] Date of Patent: May 30, 1995

[54] SYSTEM FOR INTERACTIVE GRAPHICAL CONSTRUCTION OF A DATA BASE QUERY AND STORING OF THE QUERY OBJECT LINKS AS AN OBJECT

[75] Inventors: Kenneth R. Banning; Wendy S. James; Shih-Gong Li, all of Austin, Tex.

[73] Assignee: International Business Machines Corporation, Armonk, N.Y.

[21] Appl. No.: 789,507

[22] Filed: Nov. 8, 1991

[51] Int. Cl.[6] .............................................. G06F 15/40
[52] U.S. Cl. ............................ 395/600; 364/DIG. 1; 364/282.1; 364/283.3; 364/283.4
[58] Field of Search ........................ 395/600, 156, 700

[56] References Cited

U.S. PATENT DOCUMENTS

| | | | |
|---|---|---|---|
| 4,752,889 | 6/1988 | Rappaport et al. | 395/12 |
| 4,905,163 | 2/1990 | Garber et al. | 395/63 |
| 4,930,071 | 5/1990 | Tou et al. | 395/600 |
| 5,019,961 | 5/1991 | Addesso et al. | 364/192 |
| 5,079,695 | 1/1992 | Dysart et al. | 395/700 |
| 5,091,852 | 2/1992 | Tsuchida et al. | 395/600 |
| 5,121,477 | 6/1992 | Koopmans et al. | 395/156 |
| 5,175,814 | 12/1992 | Anick et al. | 395/161 |
| 5,201,046 | 4/1993 | Goldberg et al. | 395/600 |
| 5,201,047 | 4/1993 | Maki et al. | 395/600 |
| 5,212,771 | 5/1993 | Gane et al. | 395/160 |
| 5,241,671 | 8/1993 | Reed et al. | 395/600 |
| 5,276,870 | 1/1994 | Shah et al. | 395/600 |
| 5,303,379 | 4/1994 | Khoyi et al. | 395/700 |
| 5,347,632 | 9/1994 | Filepp et al. | 395/200 |

FOREIGN PATENT DOCUMENTS 0120185 10/1984 European Pat. Off. .

OTHER PUBLICATIONS

IBM TDB, "Visual Representation of Database Query Definition", vol. 33, No. 9, Feb. 1991, pp. 238-242.
IEEE Workshop on Visual Languages 4, Oct. 1989, Rome IT, "IconicBrowser: An Iconic Retrieval System for Object-Oriented Databases", K. Tsuda et al, pp. 130-137.
Computer, vol. 23, No. 3, Mar. 1990, Long Beach US, "A Graphical Data Manipulation Language for an Extended Entity-Relationship Model", B. Czejdo et al, pp. 26-36.
Proceedings 15th COMPSAC Conference 11, Sep. 1991, Tokyo Japan, "Visual Knowledge Query Language as a Front-End to Relational Systems", K. L. Siau et al, pp. 373-378.
IBM Technical Disclosure Bulletin vol. 30, No. 1 Jun. 1987 Intelligent Scheduling, Query and Reporting Data Base.
IEEE Transactions on Software Engineering. vol. 14, No. 5, May 1988, An Efficient Pictorial Database System for PSQL, Nick Roussopoulos, Christos Faloutsos and Timos Sellis.

Primary Examiner—Thomas G. Black
Assistant Examiner—Wayne Amsbury
Attorney, Agent, or Firm—Mark S. Walker; Lawrence K. Stephens

[57] ABSTRACT

A method, system and program providing graphical queries and direct manipulation of a database is disclosed. In a preferred form, tables and lists are configured from a database to define a common data structure. Additional, dynamic data structures are employed based on information entered by a user to define various relationships between the dynamic data and the database information. The system employs a graphical query interface and a relational database to provide an ergonomic, natural interface for a database user.

12 Claims, 22 Drawing Sheets

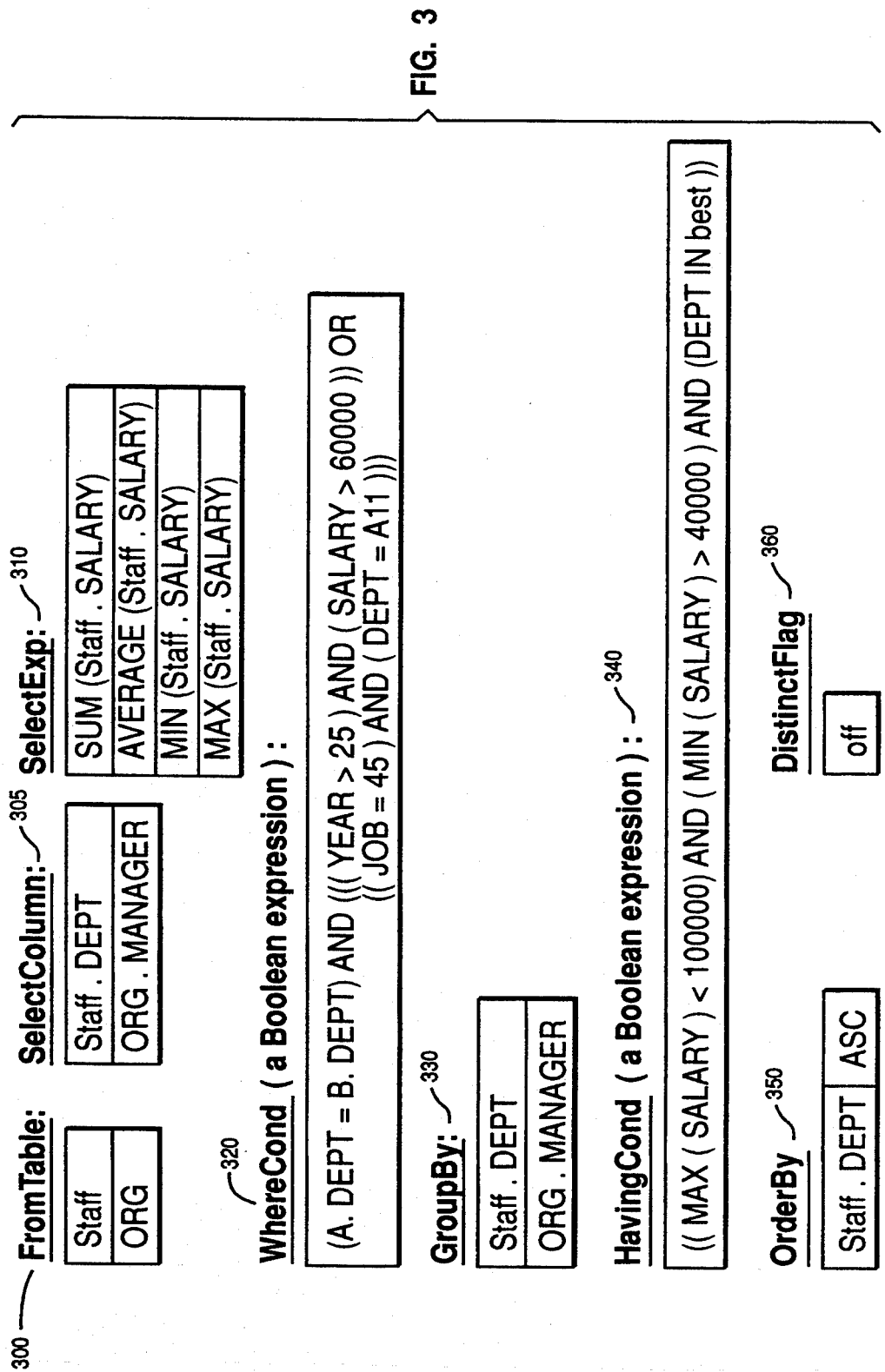

W_Node Loc Type (470)

| NodeName | Coordinates | Type |
|---|---|---|
| N1 | (1, 2) | OR |
| N2 | (2, 3) | AND |
| N3 | (2, 1) | AND |
| N4 | (3, 3) | Pred |
| N5 | (3, 2.5) | Pred |
| N6 | (3, 1.5) | Pred |
| N7 | (3, 1) | Pred |

Column List (Staff) (410)

| ColumnName | Flag |
|---|---|
| DEPT | ON |
| SALARY | OFF |
| YEAR | OFF |
| JOB | OFF |

415 / 400

Column List (ORG) (450)

| ColumnName | Flag |
|---|---|
| DEPT | OFF |
| MANAGER | ON |

452

W_Join List (420)

| LeftSide | RightSide |
|---|---|
| Staff.DEPT | ORG.DEPT |

422 / 424

W_Parent Children (480)

| ParentNode | ChildrenNodes |
|---|---|
| N1 | (N2, N3) |
| N2 | (N4, N5) |
| N3 | (N6, N7) |

482 / 484

W_Predicate Data (455)

| NodeName | LeftSide | CompOp | ValueButton | RS_Value | SubqueryButton | RS_Subquery |
|---|---|---|---|---|---|---|
| N4 | Staff.YEAR | > | ON | 25 | OFF | Null |
| N5 | Staff.SALARY | > | ON | 60000 | OFF | Null |
| N6 | Staff.JOB | = | ON | 45 | OFF | Null |
| N7 | ORG.DEPT | = | ON | All | OFF | Null |

H_ParentChildren

| ParentNode | ChildrenNodes |
|---|---|
| N1 | ( N2, N3, N4 ) |

490

H_NodeLoc Type

| Node Name | Coordinates | Type |
|---|---|---|
| N1 | ( 1, 2 ) | AND |
| N2 | ( 2, 3.5 ) | Pred |
| N3 | ( 2, 2.5 ) | Pred |
| N4 | ( 2, 1 ) | Pred |

492

H_Predicate Data

| NodeName | LeftSide | Comp Op | Value Button | RS_Value | Subquery Button | RS_Subquery |
|---|---|---|---|---|---|---|
| N2 | MAX(Staff.SALARY) | < | ON | 100000 | OFF | Null |
| N3 | MIN(Staff.SALARY) | > | ON | 40000 | OFF | Null |
| N4 | ORG.DEPT | IN | OFF | Null | ON | best |

GroupList 495

| ColumnName | GroupCheck |
|---|---|
| Staff . DEPT | on |
| Staff . SALARY | off |
| Staff . YEAR | off |
| Staff . JOB | off |
| ORG . DEPT | off |
| ORG . MANAGER | on |

OrderList 496

| ColumnName | OrderOp | OrderNumber |
|---|---|---|
| Staff . DEPT | ASC | 1 |
| Staff . SALARY | Null | Null |
| Staff . YEAR | Null | Null |
| Staff . JOB | Null | Null |
| ORG . DEPT | Null | Null |
| ORG . MANAGER | Null | Null |

FIG. 6

S_ParentChildren — 497

| ParentNode | ChildrenNodes |
|---|---|
| Null | Null |
| Null | Null |
| Null | Null |

S_NodeLocType — 498

| NodeName | Coordinates | Type |
|---|---|---|
| Null | Null | Null |
| Null | Null | Null |
| Null | Null | Null |

S_NodeQuery — 499

| NodeName | QueryName |
|---|---|
| Null | Null |
| Null | Null |
| Null | Null |

EMPTY LISTS - NO SET OPERATION USED IN EXAMPLE

FIG. 7

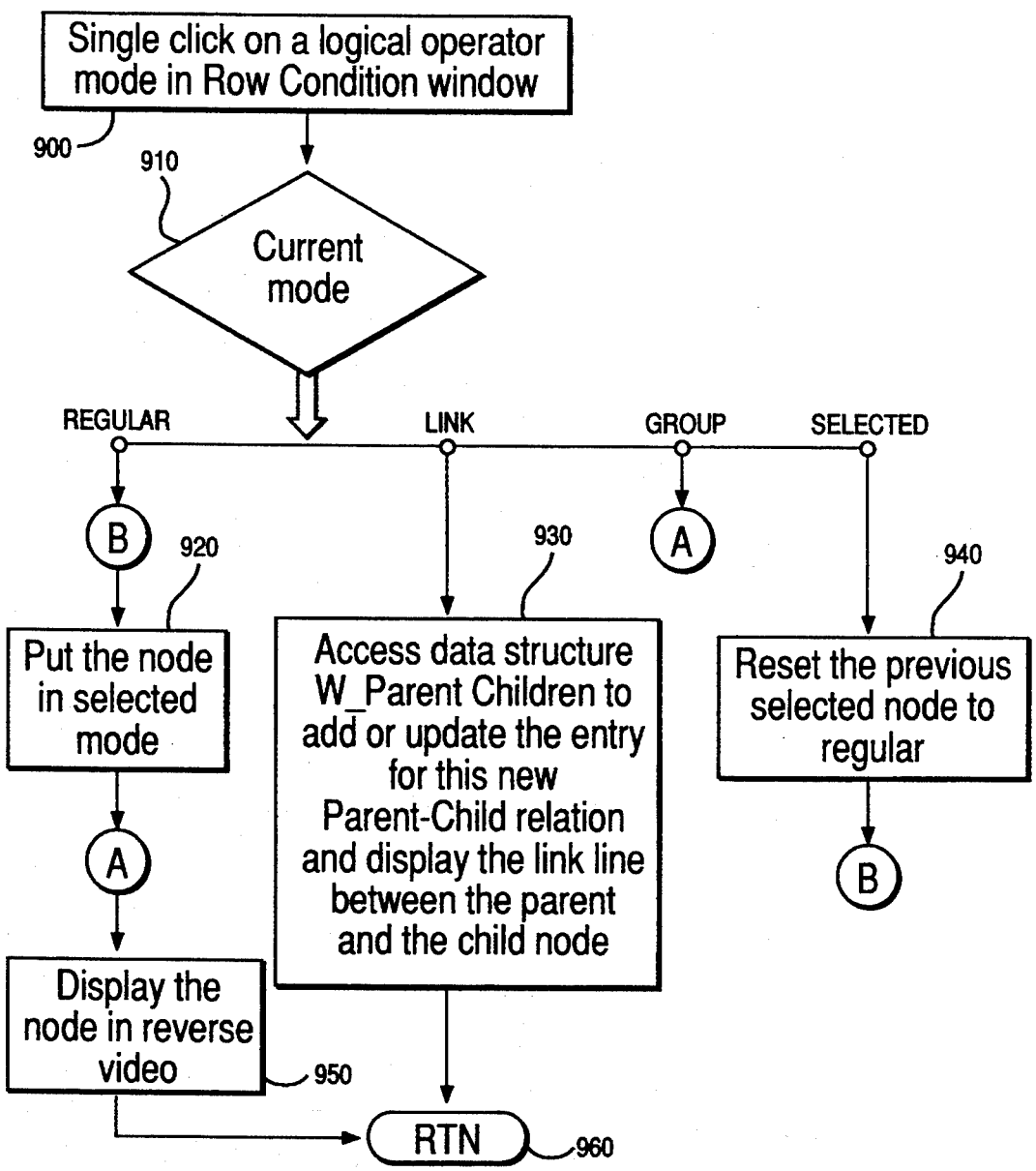
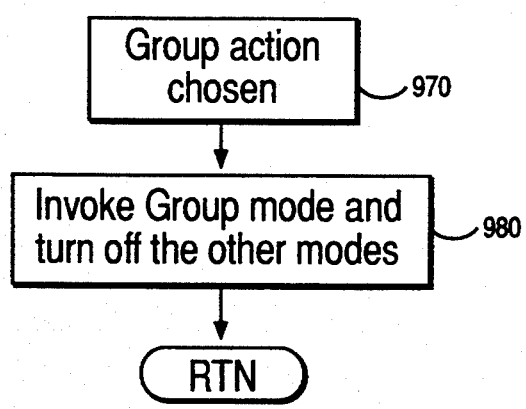
FIG. 19

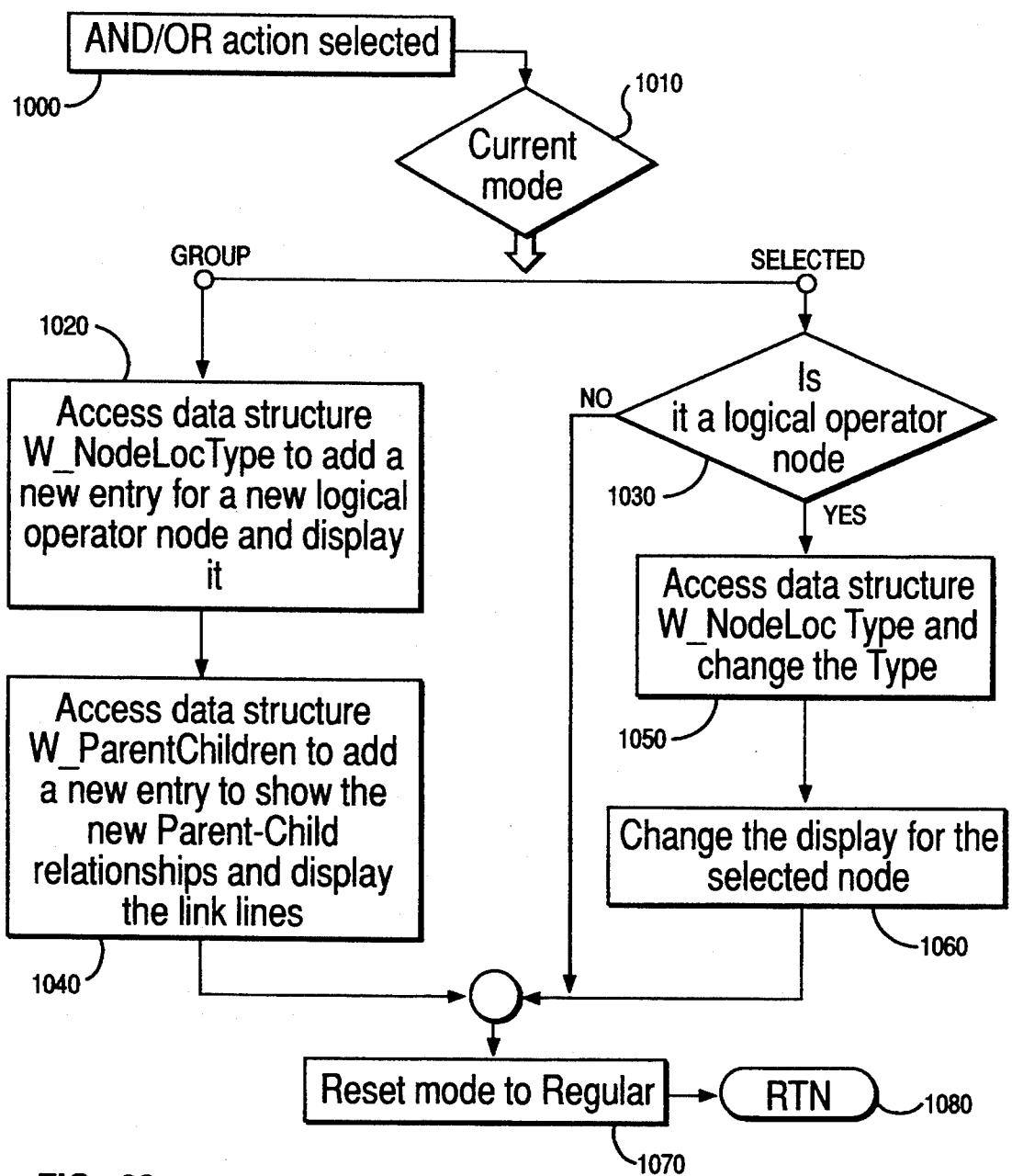
FIG. 20
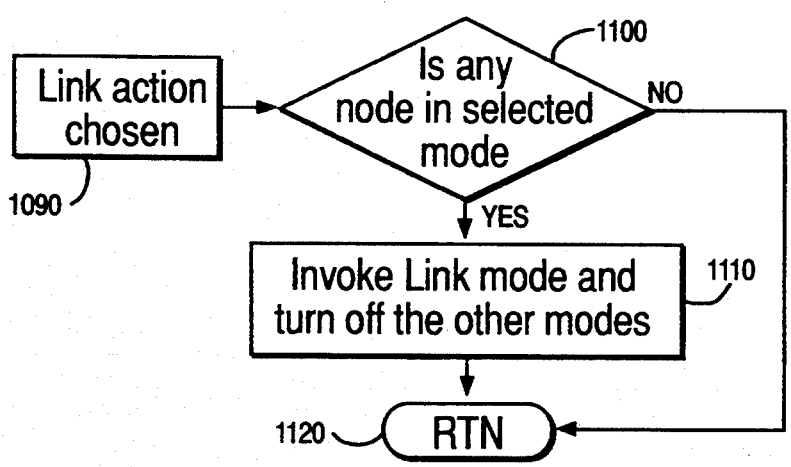

SYSTEM FOR INTERACTIVE GRAPHICAL CONSTRUCTION OF A DATA BASE QUERY AND STORING OF THE QUERY OBJECT LINKS AS AN OBJECT

FIELD OF THE INVENTION

This invention generally relates to improvements in database queries and more particularly to direct, graphical manipulation of database queries.

CROSS REFERENCE TO RELATED APPLICATIONS

Subject matter in the present application is related to the invention in U.S. patent application Ser. No. 07/628,543 filed Dec. 17, 1990 under the title "Tree Structure Representation Of An SQL Clause", now abandoned.

Subject matter in the present application is related to the invention in U.S. patent application; AT9-90-034; Ser. No. 07/790,625 filed Nov. 1, 1991 under the title "Graphical Query System", now abandoned.

BACKGROUND OF THE INVENTION

Databases have become the subject of significant recent interest, not only because of the increasing volume of data being stored and retrieved by computerized databases but also by virtue of the data relationships which can be established duping the storage and retrieval processes.

Structured Query Language (SQL), and in particular ANSI SQL, has become a preferred language media fop communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

The concept of portraying a query in a graphical depiction on a display screen of a workstation is a relatively new approach to relational database interfacing. Visual queries, often referred to as graphical queries, utilize workstation graphics to represent query objectives heretofore defined by SQL statements. A visual query presents a pictorial depiction of the objectives of a search, thereby eliminating any need for a user to learn a query language, improving the rate at which SQL queries can be formulated, and reducing the defect or error rate of queries.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. The end users of such databases are routinely less proficient in the very tools needed to efficiently and accurately access the relational database information. Finally, users of database access methods do not receive direct feedback of changes based on their manipulation of the database. Thus, a distinct need exists for methods, systems and programs which convert query statements into visual representations understandable by novice database users, and, in the compliment, which convert graphically or visually represented queries into SQL format statements usable in existing databases and network environments.

An article by Faloutos, F., and Sellis, T., entitled, "An Efficient Pictorial Database System for PSQL", *IEEE Transactions on Software Engineering*, Vol. 14, No. 5, May 1988, discusses a prior art technique for searching a K or B-tree database using efficient data structures for optimizing the search, The report discusses access techniques fop retrieving information and displaying the information on graphical displays. For example, demographic information can be used to retrieve information and format it graphically to reflect population in various sections of the United States. An improvement to further optimize the access of data fop subsequent graphic display is disclosed in U.S. Pat. No. 4,905,163 and IBM Technical Disclosure Bulletin Vol. 30, No. 1, June 1987, *Intelligent Scheduling, Query and Reporting Data Base.*

An example of a dynamic, graphical display for a knowledge base application is found in U.S. Pat. No. 4,752,889 to Neuron Data. The patent discloses a graphical tree structure depiction of a knowledge base that is updated after changes are made to the database via user line commands. None of the prior art references disclose or suggest a graphic interface for directly manipulating a database and reflecting the changes in a dynamic manner.

SUMMARY OF THE INVENTION

Accordingly, it is a primary object of the present invention to provide a user with graphical, query software to directly manipulate a database.

These and other objects of the present invention are accomplished by the operation of an algorithm in the memory of a processor. The processor accesses data structures to determine the current status of a database and displays the logical relationships of the information stored in the database graphically. A user employs a pointing device to select and change portions of the database and its logical relationships via the graphic user interface. The selection and changes are dynamically applied to the relational database via modifications to the underlying data structures and reflected graphically on the display.

BRIEF DESCRIPTION OF THE DRAWINGS

FIGS. 3-7 schematically depict a set of common data structures for bidirectional translation in accordance with the subject invention;

FIG. 19 is a flow diagram of the detailed logic in accordance with the subject invention;

FIG. 20 is a flow diagram of the detailed logic in accordance with the subject invention.

DETAILED DESCRIPTION OF THE INVENTION

Figure 1A:
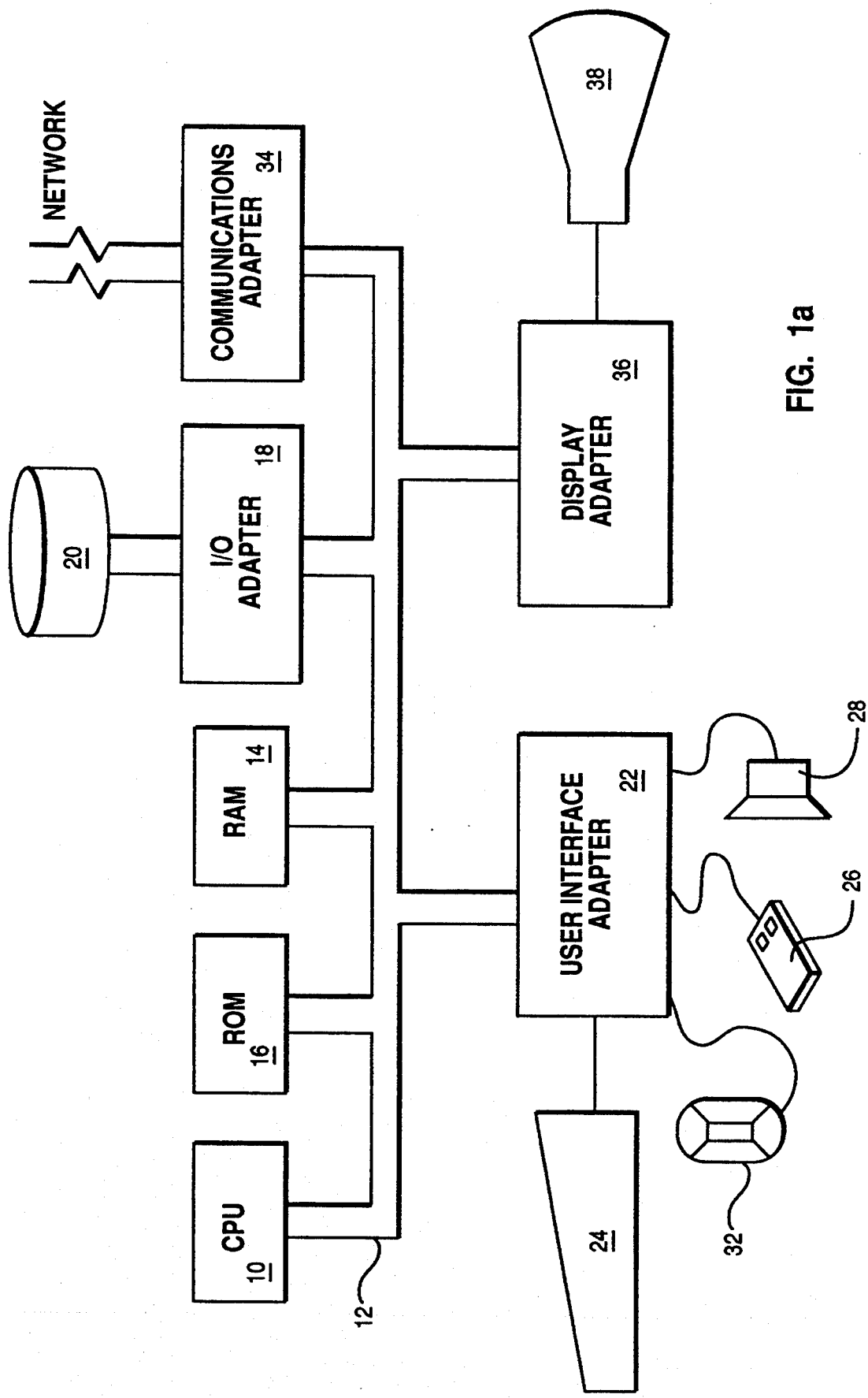
FIG. 1a is a block diagram of a personal computer system in accordance with the subject invention.

Queries which obtain information from relational databases are conventionally defined with ANSI standard Structure Query Language (SQL) statements. These statements define in computer recognizable terms the tables from which the data is to be extracted, the columns of interest, the conditions rows must satisfy, what columns are to be included, how the select columns are to be grouped, the order of the columns, distinctiveness constraints in the columns, connections of data within tables, and lower level or subqueries to be integrated into the base queries. A simple text describing SQL and its uses appears in the IBM Operating Systems/2 Extended Edition Database Manager Structured Query Language (SOL) Concepts booklet published by IBM Corporation in 1991. In addition to the ANSI standard SQL statements, there exist a number of nonstandard SQL statements within the relational database community. Thus, any bidirectional translation resource must have the diversity of structure to interface a broad spectrum of relational database SQL language variances.

As noted earlier, comprehensive bidirectionality of the translation is important from the perspective of migrating from established SQL queries to their graphical or visual query equivalents. It is inefficient to require the regeneration of existing SQL queries into the visual environment. At the same time, new visual queries should be available in SQL format for use on existing hardware with existing and relational databases. Comprehensive bidirectionality and direct manipulation via a graphical display is lacking in the prior art.

Some technologies do exist for providing very limited translation from SQL to a visual or graphical depiction. Representative examples are described in "Graphical User Languages for Querying Information: Where to look for criteria?" by Hrohr, as published in 1988 *IEEE Workshop On Visual Language*, May 1988, pages 14–20; "Design and Implementation of An Interactive Graphical Query Interface for a Relational Database Management System" by Czejdo et al, as appeared in 1988 *IEEE Workshop On Visual Languages*, May 1988 pages 21–28; and "End-User Access to Relational Databases Metaphor Database Server" by Benjamin et al, as appeared in the summer 1987 issue of *InfoDB*.

Unfortunately, the translations described such publications were lacking both in comprehensive bidirectionality and scope of diversity. Namely, the focus was only directed toward translating from SQL to visual or graphical depictions. Furthermore, the translations were not ANSI standard SQL comprehensive, in that the row condition was incapable of handling diverse logical relationships, no mathematical relationships were permitted for column data, and subquery handling was absent. None of the teachings even remotely suggested the ability to directly manipulate a database directly from the graphic display.

The article "User Interfaces for Structural Engineering Relational Database" by Howard et al as appeared in *Engineering With Computers*, 1988, pages 239–249, recognized the importance of bidirectional translation between a text based query, the defined Engineering Query Language and graphical representations. However the article did not disclose how such desirable objectives could be accomplished. The article recognized the potential need for translating relatively complex query formulations and applying them directly from a graphical interface to a database, but made no attempt to present a solution. In contrast, the present invention defines a method, system and program for accomplishing these desirable goals and doing so with the resources to handle complex formulations, including, but not limited to, the definition of complex logical and algebraic relationships between columns and the manipulation of hierarchical queries composed of subqueries.

Figure 1B:
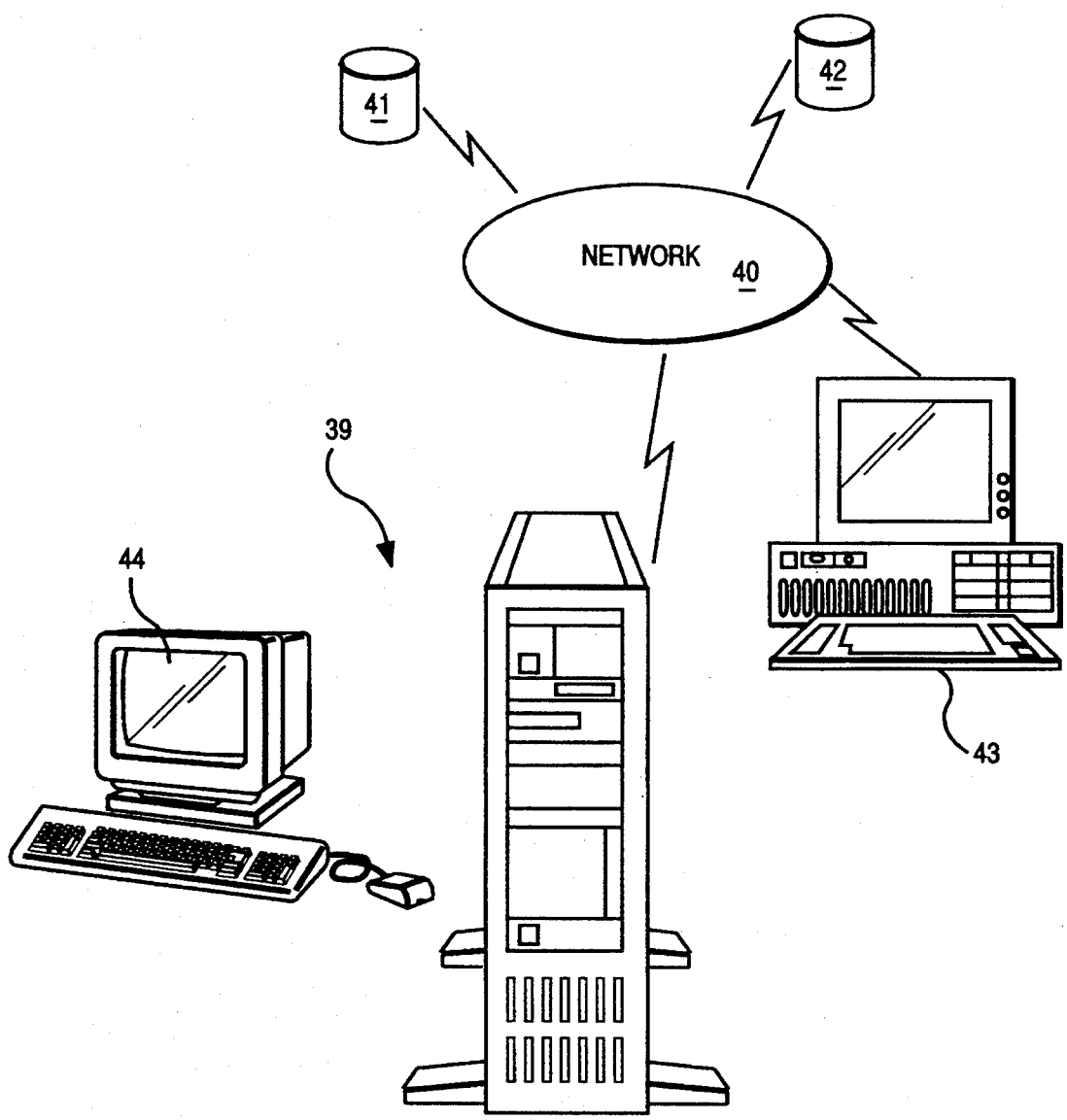
FIG. 1b schematically depicts a workstation connected to a network with a relational database in accordance with the subject invention.

The invention is preferably practiced in the context of a relational database such as is available in the OS/2 Extended Edition software program available from IBM Corporation. A representative hardware environment is depicted in FIG. 1a, which illustrates a typical hardware configuration of a workstation in accordance with the subject invention having a central processing unit 10, such as a conventional microprocessor, and a number of other units interconnected via a system bus 12, The workstation shown in FIG. 1a includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communications adapter 34 for connecting the workstation to a data processing network and a display adapter 36 for connecting the bus to a display device A network of workstations, including an IBM brand PS/2 workstation, is illustrated in FIG. 1b, having resident thereon the OS/2 Extended Edition base operating system and the aforementioned OS/2 Extended Edition relational database program. Workstation 39 includes nonvolatile storage fop the database, such as a hard disk, optical disk or tape drive media, and means for communicating into a network, generally at 40, having attached thereto further databases 41 and 42 as well as distinct non-proximate workstations such as 43. The fundamental goal is to provide a relatively inexperienced relational database user of workstation 39 with a method, system and program resources to create, modify and execute relational database queries encompassing a broad and historical base of information. The invention further contemplates that preexisting queries formulated in classical SQL format be conveyed to workstation 39 and subjected to conversion into visual or graphical queries equivalent fop display on a graphic display 44. The user thereafter refines the query, executes the query and dynamically views the results on the graphic display.

A basic tenet of the user interface architecture for Structured Query Language (SOL) queries is that unlike the computer with it's mathematical language and rigid parsing rules, humans use categories to organize information and understand relationships between objects. An object is any actual entry in a relational database. The information necessary for the computer to perform a query of a relational database using SQL is visually structured into related objects with the text representing the objects of interest and the graphical representation of these objects depicting the relationships that exist or are of interest to the requester. The reader is referred to IBM's *SQL REFERENCE*, SC26-380 (1989) for a detailed description of statements in the Structured Query Language (SOL). These statements include create, alter, and drop objects; retrieve, insert, update, and delete data in them; and grant and revoke privileges over them. The publication gives a complete description of all SQL elements and an alphabetic list of all SQL statements implemented by IBM, with descriptions of their syntax, options, and effects.

The invention creates a one-to-one mapping of the actual parts of the SQL query statements and the visual objects (including relationships). This approach facilitates a user seeing information in a meaningful form while processing the information in the most suitable form for the computer. The relationships between objects that are created dynamically by a user are referred to as presentation objects. The presentation objects and the corresponding relational database manager (RDBM) or SQL statement components are:

(1) TABLE—A window object containing a selectable list of the column names available fop use from this table. The RDBM component may in fact be a table or view object. The table (or view) names are part of the SQL FROM statement. The individual column names highlighted in the table window are part of the SQL SELECT and the SQL GROUP BY statements. (See FIG. 3, STAFF table at 54)

(2) CONNECTOR—An object depicted as an ellipse containing a logical connector for two or more constraints. The connector is joined to constraints by a Relationship. The connector may be part of:
(a) A SQL WHERE statement (the logical operator and order of the parentheses); or
(b) A SQL HAVING statement (the logical operator and order of the parentheses). (See FIG. 2, OR, and AND logical operators at 56)

(3) RELATIONSHIP—An object depicted as a solid line connecting two objects. The relationship is used to display that some interrelation exists between the objects. The relationship may be to join objects with some mathematical relationship, grouping of objects, or designating that some object is derived from another. The RDBM component may be a referential integrity constraint. The relationship may be part of:
(a) A SQL WHERE statement (a join relationship equating records in 2 or more tables, or the parenthetical grouping connecting the components by a Connector object); or
(b) A SQL HAVING statement (the parenthetical grouping connecting the components by a Connector object). (See FIG. 2, link line signifying a join operation between rabies 54 and 55; see also, 56 lines joining the logical AND and OR operations)

(4) NEW COLUMN—A window object containing a selectable list of the column created by applying a specific function against one or more of the columns available in a table object. The Table object column name objects used do not need to be selected in the Table object. The SQL component is the individual function components of the SQL SELECT statement. The NEW COLUMN window is a sub-class of the TABLE object. The unique distinction being that the NEW COLUMN window can not have a join RELATIONSHIP object connecting it to another TABLE object. (See FIG. 2, NEW table at 50)

(5) GROUP BY—A window object containing a list of all the potential column or functions available fop use in the selected Table or New Column windows, The selected entries comprise the entries in the SQL GROUP BY statement. (See FIG. 2, GROUP table at 51)

(6) CONSTRAINT—An object depicted as a box containing a user defined restriction on the query results. Constraints are connected to a window by a Relationship. Constraints may also be connected to a Connector to join one constraint with another, Sub-queries may be included or defined in a constraint. The constraints may be part of:
(a) A SQL WHERE statement (the individual units of the statement).
(b) A SQL HAVING statement (the individual units of the statement). (See FIG. 2, (Salary>60000) at 56)

(7) ROW CONDITION—A window object containing Constraints on Tables, Connectors and Relationships. The Row Condition graphically depicts the collection of constraining relationships and how they are organized. The Row Condition Window depicts th SQL WHERE statement less any join conditions. (See FIG. 2, ROW CONDITION table at 56)

(8) HAVING CONDITION—A window object containing Constraints on the Group By, Connectors and Relationships. The Having Condition graphically depicts the collection of constraining relationships and how they are organized. The Having Condition Window depicts the SQL HAVING statement. (See FIG. 2, HAVING CONDITION table at 57)

(9) SQL STATEMENT—A window object containing the actual SQL statements being constructed from the graphical components of the Visual Query Window. (See FIG. 2, SQL STATEMENT at 53

Figure 21:
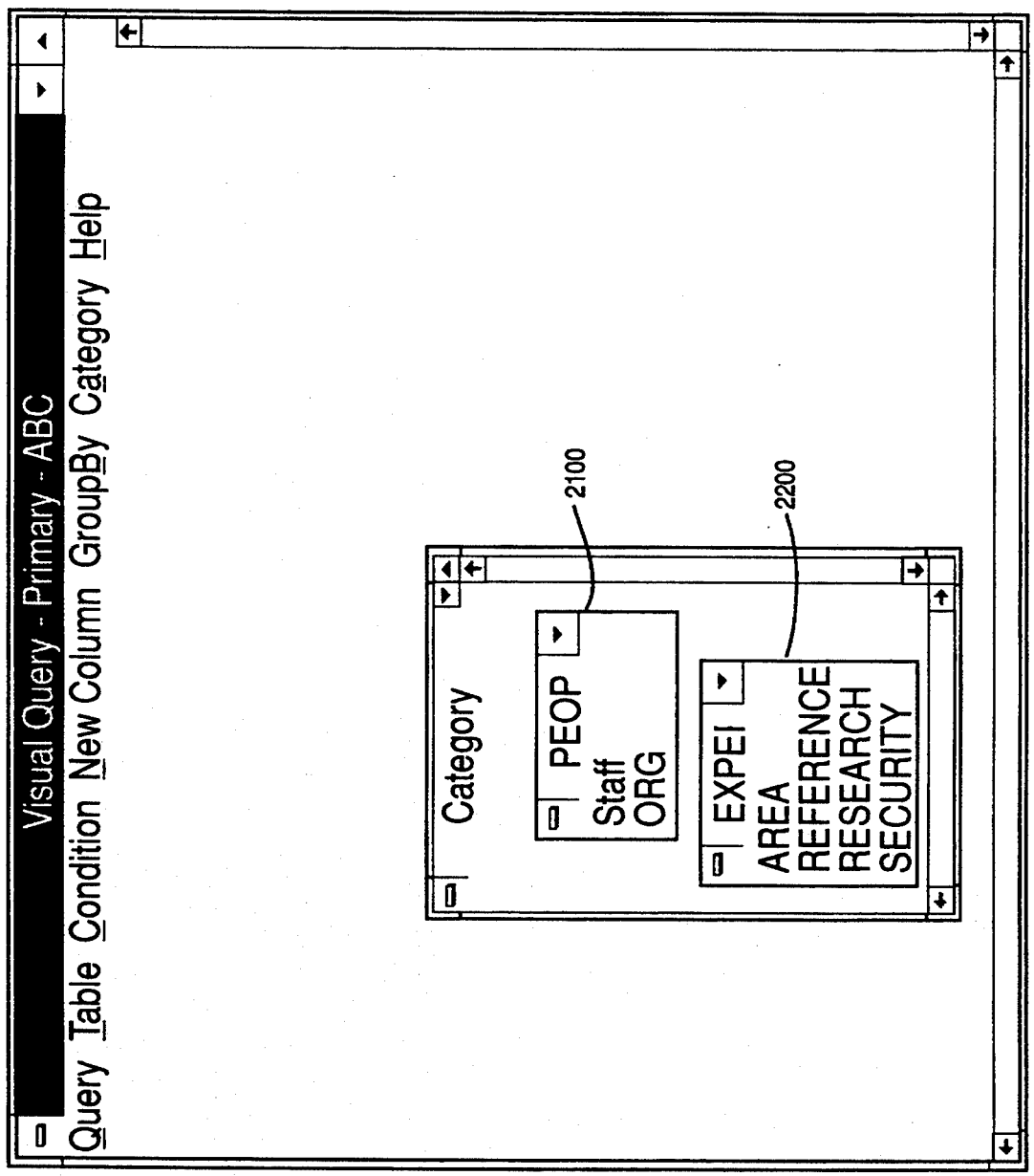
FIG. 21 illustrates a graphic display of a SQL query with a CATEGORY table in accordance with the subject invention.

(10) CATEGORY—A window object containing groups of tables (categories) that have predefined relationships submitted by the Table creator or Administrator. The Category Window is the initial object available in the Visual Query interface. Selection of a Category of objects to work with opens the interface for definition of which tables to use, the relationships for these tables, and any previously defined New Columns. Tables in a Category may be selected for use in the actual query. Any necessary relationships will be maintained by the interface for the selected items. FIG. 21 illustrates a graphic display of a SQL query with a CATEGORY window in accordance with the subject invention. 2100 points to the PEOPLE category, and 2200 points to the EXPERIENCE category. These two tables have been combined into a single window.

(11) SET OPERATION—A window object containing the selected queries in graphical form for direct manipulation to perform the set operations of Union, Intersection, and Except. The window function is described in IBM Technical Disclosure Bulletin Vol. 33 No. 6A, November 1990, "Visual Model For Database Set Operations".

(12) RESULTS—A window object containing the results of a committed Visual Query.

A visual query interface initiates in a window based system. This window will be used to graphically depict:
Database tables and views involved in the query.
Columns, expressions and summaries used in the query.
Any constraints to limit the results of the basic query including:
 * Column constraints;
 * Having clauses; and
 * Sub-queries.
Grouping of the results.
Relationships of the tables and views to one another.
The relationship and combining form of the constraints.
The total results of a defined query to be used as:
 * a sub-query; and
 * with other query results in a set operation (union, intersect, difference).

Objects can be manipulated by one of the three basic actions of select, define or relate. The results of these actions are similar but uniquely individual for each object type. That is to say, the action of defining any part is the same for all parts. Only the object itself is aware of what part of the SQL statement it in fact must create. The interaction and creation of the New Columns, Having Condition and Row Condition objects also is unique in that these objects are treated as subclasses of other objects.

Figure 2:
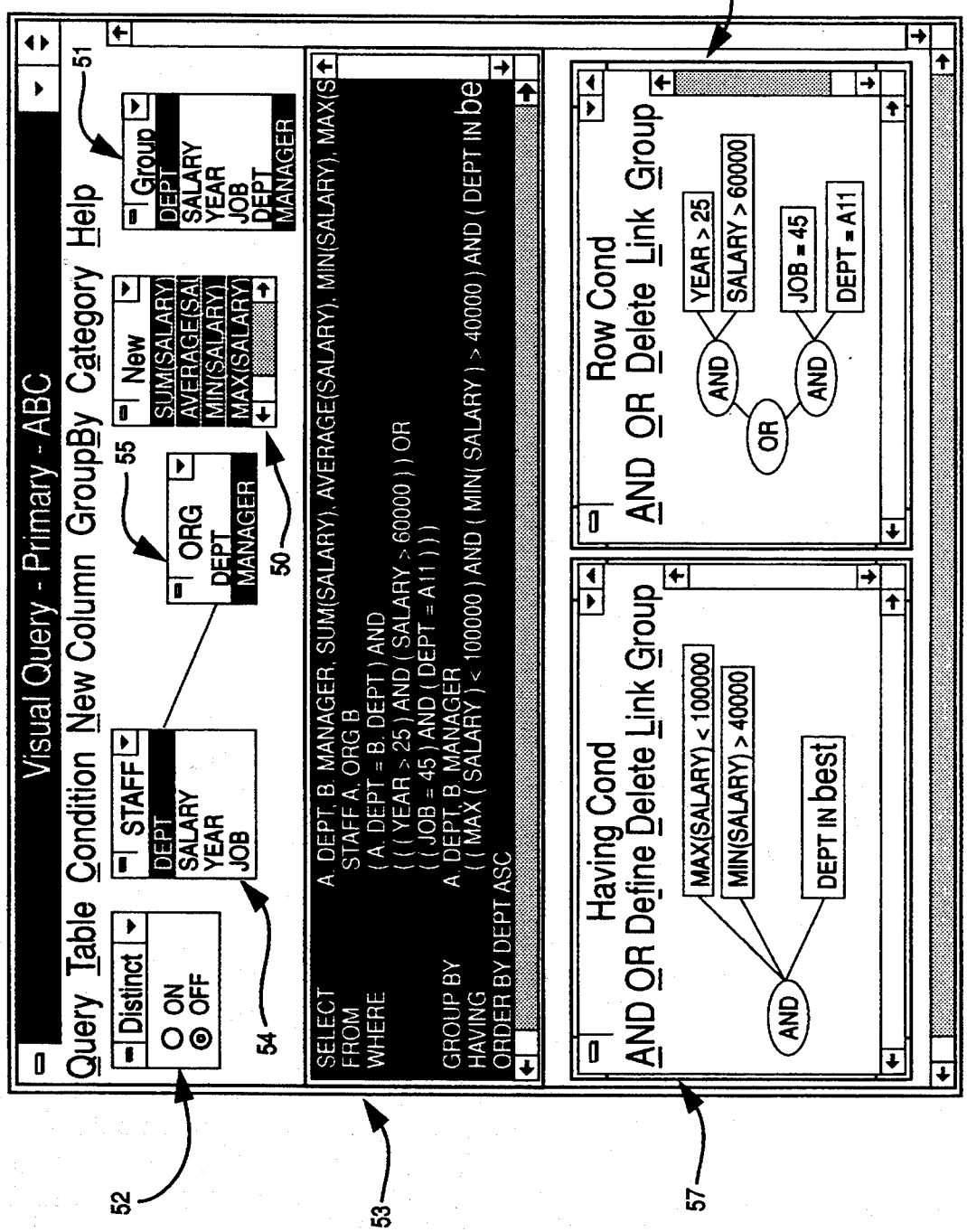
FIG. 2 is an illustration of a visual query display, including windows suitable for defining queries and a window containing SQL statements in accordance with the subject invention.

FIG. 2 illustrates a sample layout for a video display screen, such as screen 44 of workstation 39 in FIG. 1b, to illustrate the content of a visually or graphically depicted query together with its SQL text equivalent. The SQL statement, generally in window 53, includes SELECT, FROM, WHERE, GROUP BY, HAVING and ORDER BY clauses, diverse logical relationships, mathematical relationships and subqueries. Note that most clauses and related tables are shown in independent windows. An example is the FROM clause in SQL window 53 which defines that the columns headed department (DEPT) and manager (MANAGER) are selected from independent tables respectively identified as staff (Staff) in window 54 and organization (ORG) in window 55. When new columns are defined in the SELECT clause, the columns are identified as being new by appropriate window 50. A separate window is also created to identify that the GROUP BY clause has related a selected pair of columns from the potential sets defined by the interaction of the two tables as depicted in window 51. Namely, columns DEPT and MANAGER are selected for grouping from the two tables Staff 54 and ORG 55. Small window 52 is used to show that the distinct function has been disabled, thereby allowing redundancy in the rows selected for the response. No window is included to show that the answer has been defined to have an SQL ORDER BY requirement, namely, that the department listings be in ascending alphanumeric order.

The two windows at the bottom of the screen, 56 and 57, depict in graphical form the logical and mathematical relationships defined to satisfy the WHERE clause, a row condition, and the HAVING clause. These graphical representations of the database can be manipulated to directly change the logical relationship of information in the database in accordance with the subject invention with the preferred hardware and video display screen graphic environments defined, the ensuing description will focus on how the subject invention implements the dynamic, graphical changing of a database.

One aspect of the invention was the recognition that bidirectional translation or conversion between text based SQL query statements and graphically based visual query representations requires the creation and use of a common data structure. As embodied, the common data structures are composed of multiple relatable lists. When the origin of a query is an SQL statement, the content of the lists for the common data structure is extracted by conventional parsing of a SQL statement. In the case of a graphical query, the data for the lists is captured and transformed into a common data structure during a graphical manipulation by a user.

The use of a common data structure provides a number of benefits. Of paramount importance is bidirectional translation between a SQL query statement and a graphical representation of the query. The common data structure described herein presumes an ANSI standard SQL language. However, and to the benefit of the user, the common data structure is amenable to additions as needed to cover SQL language variances. In part, this is attributable to the structured character of SQL, a language basically composed of distinguishable clauses.

ANSI standard SQL employs a data structure composed of eight elements. The composition of the structures as applied to the example query illustrated in FIG. 2 is depicted schematically by block diagram in FIG. 3. This SQL query establishes the following set of eight basic data structures: (1) FromTable 300 contains an ordered list of tables from which data is to be queried, (2) SelectColumn 305 has an ordered list of the column names which are included in the Select Clause, (3) SelectExp 310 includes an ordered list of expressions and column functions that are included in the SELECT clause, (4) WhereCond 320 holds the boolean expression in the WHERE clause, (5) GroupBy 330 comprises an ordered list of column names which are in the GROUP BY clause, (6) HavingCond 340 stores the boolean expression in the HAVING clause, (7) OrderBy 350 keeps the ordered list of (O_ColumnName, OrderOp) where OrderOp defines either an ASC (ascending) or a DSC (descending) order of listing and O_ColumnName is the column name specified in the Order By clause, and (8) DistinctFlag 360 tracks the state of the DISTINCT key word.

To provide comprehensive bidirectionality between text format and visual representations of SQL queries, a preferred arrangement also includes an additional group of common data structures depicted in FIG. 4. The title of such data structure, and is format, are set forth below.

(9) ColumnList 400 keeps a data structure list for each table in the FromTable list. ColumnList contains a full list of the (ColumnName, Flag) data. The Flag data indicates if the ColumnName is selected for the SELECT clause. This list is readily constructed with system catalog information from the database management system.

(10) W_JoinList 420 comprises a list of (LeftSide, RightSide) storing the "LeftSide equal to RightSide" information, where both LeftSide and RightSide are columns belonging to tables listed in FromTable. Each entry In this list is considered a Join condition for the query and as such is not included in the Row Condition window.

(11) W_ParentChildren 480 reserves a list of (ParentNode, ChildrenNodes) where ChildrenNodes are n-tuple consisting of the node names, which nodes are the children of the node specified in the ParentNode. For example, (N1, (N3, N4, N5)) represents that nodes N3, N4 and N5 are the children nodes of node N1. This list is used for the WHERE condition.

(12) W_NodeLocType 470 is a list of (NodeName, Coordinates, Type), where Coordinates are the coordinates of NodeName relative to the bottom left corner of the Row Condition window, and Type indicates that NodeName is a logical operator (AND or OR) node or a predicate.

(13) W_PredicateData 455 constitutes a list (NodeName, LeftSide, CompOp, ValueButton, RS_Value, SubqueryButton, RS_Subquery) storing the information of the predicates in the WHERE condition. CompOp is the comparison operator. LeftSide is the expression left of the CompOp in the predicate. If ValueButton is in the ON state, the expression to the right of the CompOp in the predicate is merely a simple expression whose text is stored in RS_Value list. If the SubqueryButton is ON, the right side is treated as another SELECT statement, thus considered a subquery to the SQL query statement. The subquery is represented by a query name stored in the RS_Subquery list. The subquery is an individual query statement, in that it has its own data structure independent from the data structure query within which it resides.

FIG. 5 and 6 are block diagrams of additional data structures used by the subject invention.

(14) H_ParentChildren 490 is a similar list as the W_ParentChildren, but is employed by the HAVING condition.

(15) H_NodeLocType 492 is similar to the W_NodeLocType but is employed by the HAVING condition.

(16) H_PredicateData 494 is similar to the W_PredicateData, but used by the HAVING condition.

(17) GroupList 495 is a list of (ColumnName, GroupCheck) based upon the GroupBy structure. This list groups all the column names in ColumnList(I) for every Table(I) in the FromTable list. If a ColumnName entry also exists in the GroupBy list, the GroupCheck data is set ON. Otherwise, GroupCheck is set OFF.

(18) OrderList 496 is composed of (ColumnName, OrderOp, OrderNumber) and is based on the OrderBy structure. The list groups all the column names in ColumnList(I) from every Table(I) in the FromTable list. If a ColumnName entry also exists in the OrderBy list, the OrderNumber represents its position in the OrderBy list. Otherwise, the OrderNumber is left blank (null).

If the SQL language subject to bidirectional translation includes SET operations (UNION, INTERSECTION, EXCEPT, etc.), each query statement is treated as an individual query and a tree structure is used to represent the entire query. In the tree structure representation, the operator nodes are: UNION, UNION ALL, INTERSECT, INTERSECT ALL, EXCEPT, EXCEPT ALL, etc. In such a situation, the leaf nodes display the names for the query parts involved in the entire query. To implement this further SQL statement capability, three additional common data structures are required. These additional data structures are set forth in FIG. 7.

(19) S_ParentChildren 497 is a list of (ParentNode, ChildrenNodes) in which the ChildrenNodes is an n-tuple consisting of the node names which are children of the node specified in the ParentNode. For example, (N1, (N3, N4, N5)) represents that node N3, N4 and N5 are Child Nodes of node N1. This list is used with all queries having a SET operation.

(20) S_NodeLocType 498 is composed of (NodeName, Coordinates, Type) where Coordinates are the coordinates of NodeName relative to the bottom left corner of the query window, and Type indicates that NodeName is a SET operator (UNION, UNION ALL, INTERSECT, INTERSECT ALL, EXCEPT, EXCEPT ALL) node or a query.

(21) S_NodeQuery 499 is a list composed of (NodeName, QueryName) which links the query names with names of the nodes in the tree structure representation. Each query is regarded as an individual query with independent data structure.

The foregoing lists are the core group of common data structures required for implementation conventional SQL language queries in a comprehensive bidirectional translation environment, For special queries, including non-ANSI standard types, minor variations in the parsing Pules and information are necessary. In those cases where the input has a previously generated SQL statement, a preferred arrangement of the present invention includes a resource to detect nonstandard statements during the parsing operation, Once intercepted, nonstandard SQL statements can be manually translated by the user or, if the frequency dictates, can be subjected to automatic translation using extensions of the data structures defined herein.

It should also be recognized that the present invention provides resources to generate common data structures for incomplete queries. The ability to translate in increments is particularly valuable from the perspective of tracking the evolution of a query in its SQL and visual counterparts.

Pseudocode, from which source code and related object code can be derived, suitable to practice the presently disclosed system, method and program is set forth below.

representation. Each query is regarded as an individual query with independent data structure.

The foregoing lists are the core group of common data structures required for implementation conventional SQL language queries in a comprehensive bidirectional translation environment. For special queries, including non-ANSI standard types, minor variations in the parsing rules and information are necessary. In those cases where the input has a previously generated SQL statement, a preferred arrangement of the present invention includes a resource to detect nonstandard statements during the parsing operation. Once intercepted, nonstandard SQL statements can be manually translated by the user or, if the frequency dictates, can be subjected to automatic translation using extensions of the data structures defined herein.

It should also be recognized that the present invention provides resources to generate common data structures for incomplete queries. The ability to translate in increments is particularly valuable from the perspective of tracking the evolution of a query in its SQL and visual counterparts.

Pseudocode, from which source code and related object code can be derived, suitable to practice the presently disclosed system, method and program is set forth below.

```
/*******************************************/
/* Build Common Data Structure from Visual Query */
/* Interface                                */
/*******************************************/

/*A Table being selected */
TableSelectProc(STableName)
    Get Stablename from the interface
    /* FromTable is a list */
    If Stablename is in FromTable
```

```
        Return
EndIf
If FromTable is empty
        I = 0
Else
        I = the Last Entry number of FromTable
EndIf
I = I + 1
FromTable(I) = Stablename
/* Build ColumnList for TableName */
/* Each entry of ColumnList is (ColumnName,
        Flag) */
Get the names of columns belonged to Stablename
    from System Catalog and build the ColumnList
        list for Stablename with each Flag set to be OFF
Determine the location on the screen to display a
        window that has Stablename as its title bar and
        ColumnList as the contents of its client area
Return /* A Column displayed in a table window being
   selected */
ColumnSelectProc(SColumnName)
    Change the display mode for SColumnName to be
        reverse video
    Find the TableName for this SColumnName
    Add TableName.SColumnName to the SelectColumn list
    Find the matched entry in ColumnList for TableName
    Set its Flag to be ON
    Return /* A selected Table being deselected */
TableDeselectProc(DTableName)
    Remove DTableName from FromTable
    Remove the display of DTableName window
    For Each Entry (TableName.ColumnName) of
        SelectColumn Do
            If TableName = DTableName
                Get the ColumnList for DTableName
                If ColumnName exists in ColumnList for
    DTableName remove this entry from
                    SelectColumn
                EndIf
            EndIf
        EndDo
For Each Entry of ColumnList for DTableName Do
```

```
      Reset Flag to be OFF
   EndDo
   Get SelectExp
   For Each Entry (ExpFct) of SelectExp Do
      For Each ColumnName in ExpFct Do
            If ColumnName exists in ColumnList for
               DTableName remove this ExpFct from
         SelectExp
            EndIf
      EndDo
   EndDo
   Get WhereCond
   For Each Predicate in WhereCond Do
      For Each ColumnName in Predicate Do
            If ColumnName exists in ColumnList for
                  DTableName remove this Predicate and its
                  associated operator from Wherecond
            EndIf
      EndDo
   EndDo
   Get W_JoinList
   For Each Entry (TableName1.ColumnName1,
      TableName2.ColumnName2) of W_JoinList Do
         If TableName1 = DTableName or
               TableName2 = DTableName
            remove this Entry from W_JoinList
         EndIf
   EndDo
   Get GroupBy
   For Each Entry (GColumnName) of GroupBy Do
      If GColumnName exists in ColumnList for
         DTableName remove this Entry from GroupBy
      EndIf
   EndDo
   Get HavingCond
   For Each Predicate in HavingCond Do
      For Each ColumnName in Predicate Do
            If ColumnName exists in ColumnList for
               DTableName remove this Predicate and its
            associated operator from HavingCond
            EndIf
      EndDo
   EndDo
   Get OrderBy
   For Each Entry (O_ColumnName,OrderOp) of OrderBy Do
```

```
    If O_ColumnName exists in ColumnList for
        D_TableName remove this Entry from OrderBy
    EndIf
EndDo
Reconstruct W_ParentChildren
Reconstruct W_NodeLocType
Reconstruct W_PredicateData
Reconstruct GroupList
Reconstruct H_ParentChildren
Reconstruct H_NodeLocType
Reconstruct H_PredicateData
Reconstruct OrderList
Redisplay the WhereCondition Window
Redisplay the GroupBy Window
Redisplay the HavingCondition Window
Redisplay the OrderBy Window
Redisplay the Visual Query Window with updated
    information
Return /* A selected Column displayed in a table window being
deselected */
ColumnDeselectProc(ColumnName)
    Change the display mode for ColumnName to be normal
    Find the TableName for this ColumnName
    Remove TableName.ColumnName to the SelectColumn
            List
    Find the matched entry in ColumnList for TableName
    Set its Flag to be OFF
    Return /* A JOIN relationship being defined via direct
manipulation */
JoinDefinedProc(ColumnName1, ColumnName2)
    Find the location for ColumnName1
    Find the location for ColumnName2
    Draw a line to connect the two locations
    Find the TableName1 for ColumnName1
    Find the TableName2 for ColumnName2
    Add (TableName1.ColumnName1,
            TableName2.ColumnName2) to W_JoinList
    Return /* A JOIN relationship being deleted */
```

```
JoinDeleteProc(ColumnName1, ColumnName2)
    Find the location for ColumnName1
    Find the location for ColumnName2
    Erase the line that connects the two locations
    Find the TableName1 for ColumnName1
    Find the TableName2 for ColumnName2
    Remove (TableName1.ColumnName1,
            TableName2.ColumnName2) from W_JoinList
    Return /* An expression or column function being defined */
ExpDefineProc(ExpFct)
    If SelectExp is empty
            Display the NewColumn Window
    Else
            Activate the NewColumn Window
    EndIf
    Add ExpFct to SelectExp
    Display ExpFct entry in reverse video
    Return /* An expression or column function being deleted */
ExpDeleteProc(ExpFct)
    Remove ExpFct from SelectExp
    If SelectExp is empty
            Remove the display of the NewColumn Window
            Activate the NewColumn Window
    EndIf
    Return /* A column in the GroupByList Window being
   selected */
GroupColumnSelectProc(SColumnName)
    Change the display mode for SColumnName to reverse video
    Set its GroupCheck to be ON
    Return /* A column in the GroupByList Window being
   deselected */
GroupColumnDeselectProc(DColumnName)
    Change the display mode for DColumnName to normal
    Set its GroupCheck to be OFF
    Return /* A column in the OrderByList Window being
   selected */
```

GroupColumnSelectProc(SColumnName)

Change the display mode for SColumnName to reverse video

Update the Order for SColumnName

Readjust the Order in the OrderList

Display the OrderByList Window in normal mode

Return

/* A column in the OrderByList Window being deselected */

GroupColumnDeselectProc(DColumName)

Change the display mode for DColumName to reverse video

Display the OrderOp in grey

Set its OrderNumber to NULL

Readjust the Order in the OrderList

Display the updated OrderByList in Normal mode

Return

/* The process to define a predicate for WHERE */
/* condition being invoked (e.g. by double */
/* clicking on a column name in a table window) */

WPredicateDefineProc()

Bring up the sub-process for the user to define a predicate

If sub-process is committed

Assign a new NodeName to this predicate

Determine the location for this predicate in the WhereCondition Window

Text = LeftSide + " " + CompOp + " " + RightSide

Display Text in a rectangular box at the designated location

Update W_PredicateData

Update W_NodeLocType

EndIf

Return

/* The process to update a predicate for WHERE */
/* condition being invoked (e.g. by double clicking */
/* on a predicate box in the WhereCondition Window) */

WPredicateUpdateProc(UNodeName)

Get W_PredicateData

Retrieve the LeftSide, CompOp, ValueButton, RS_Value, RS_Subquery

Bring up the sub-process for the user to update a predicate with the original information as default

```
If sub-process is committed
        If ValueButton is ON
            NewRightSide = Value
        Else
            NewRightSide = SubqueryName
            If SubqueryName is not defined
                    Invoke the process allowing the user to
                        define SubqueryName
            EndIf
        EndIf
        Text = NewLeftSide + " " + NewCompOp + " " +
                NewRightSide
        Display Text in a rectangular box at its
            original location
        Update W_PredicateData
EndIf
Return /* The process to modify or construct the tree      */
/* structure for the WHERE condition in the         */
/* WhereCondition Window being invoked              */
WhereTreeProc()
   Update W_ParentChildren
   Update W_NodeLocType
   Update the display of WhereCondition Window
   Return /* The process to define a predicate for HAVING     */
/* condition being invoked (e.g. by double          */
/* clicking on a column name in a table window)     */
HPredicateDefineProc()
   Bring up the sub-process for the user to define a
            predicate
   If sub-process is committed
            Assign a new NodeName to this predicate
            Determine the location for this predicate in the
                HavingCondition Window
            Text = LeftSide + " " + CompOp + " " + RightSide
            Display Text in a rectangular box at the
                designated location
            Update H_PredicateData
            Update H_NodeLocType
   EndIf
   Return /* The process to update a predicate for HAVING     */
```

```
/* condition being invoked (e.g. by double clicking */
/* on a predicate box in the HavingCondition Window)*/ */
HPredicateUpdateProc(UNodeName)
    Get H_PredicateData
    Retrieve the LeftSide, CompOp, ValueButton,
            RS_Value, RS_Subquery
    Bring up the sub-process for the user to update a
            predicate with the original information as
            default
    If sub-process is committed
            If ValueButton is ON
                NewRightSide = Value
            Else
                NewRightSide = SubqueryName
                If SubqueryName is not defined
                    Invoke the process allowing the user to
                            define SubqueryName
                EndIf
            EndIf
            Text = NewLeftSide + " " + NewCompOp + " " + NewRightSide
            Display Text in a rectangular box at its
                original location
            Update H_PredicateData
    EndIf
    Return /* The process to modify or construct the tree      */
/* structure for the Having condition in the        */
/* HavingCondition Window being invoked             */
HavingTreeProc()
    Update H_ParentChildren
    Update H_NodeLocType
    Update the display of HavingCondition Window
    Return /* The process to define a query with SET           */
/* operations being invoked                         */
SETQueryProc()
    Invoke a new Visual Query Window for this query
            definition
    Invoke the process allowing the user to construct a
    tree structure for this query:
            (1) Dragging query icons into this window
            (2) Defining SET operator nodes
    Update S_NodeLocType
    Update S_NodeQuery
```

```
Update the display of this Visual Query with SET
       operations
Return

/************************************************/
```

Particular relevance should be given to the
fact that the present apparatus, method and
program for converting is both bidirectional and
comprehensive. The bidirectionality is
particularly important from the perspective of
migrating libraries of existing SQL queries. The
comprehensiveness eases such migration through
the ability to handle diverse logical and
mathematical relationships in the clauses, such
as the WHERE clause, together with the ability to
fully handle subqueries. The implications of
subqueries were a particular problem for
previously known approaches. The ability to
translate from SQL to visual representation is
distinctly unique, combining the parsing of SQL Particular relevance should be given to the fact that the present apparatus, method and program converting is both bidirectional and comprehensive. The bidirectionality is particularly important from the perspective of migrating libraries of existing SQL queries. The comprehensiveness eases such migration through the ability to handle diverse logical and mathematical relationships in the clauses, such as the WHERE clause, together with the ability to fully handle subqueries. The implications of subqueries were a particular problem for previously known approaches. The ability to translate from SQL to visual representation is distinctly unique, combining the parsing of SQL clauses the translation into a common data structure, and the eventual translation into both graphical blocks and the links relating the windowed data.

The visual representation of a query by windows, as set forth in FIG. 2, is preferred from the perspective of user friendliness. In a preferred context, a window is allocated for each table in the FROM statement, and contains therein a list of the column names. The column names subject to the SELECT statement are highlighted in the table windows. A NewColumn window is used to identify user defined expressions in the SELECT clause. WHERE clauses for relating predicates joined by AND and OR logic are shown by tree representation in separate windows, such as the depicted Row Cond window. GROUP BY statements are shown in a separate window, with the selected columns identified. A HAVING condition window, such as appears in FIG. 2, also contains a tree representation of the statement logic, An ORDER BY clause could also be added as a separate window to search the prescribed order. Window graphics to show whether the DISTINCT clause is ON or OFF are also depicted in FIG. 2.

A subselect in a query can be displayed by name or icon as an element of a row condition or having condition predicate. Upon selection, the subquery would have its own primary window and associated clause windows in a direct graphical hierarchy. SET operations can be shown by individual objects in the query, including graphically depicted links between windows.

Detailed Logic In Accordance With the Invention

Figure 8:
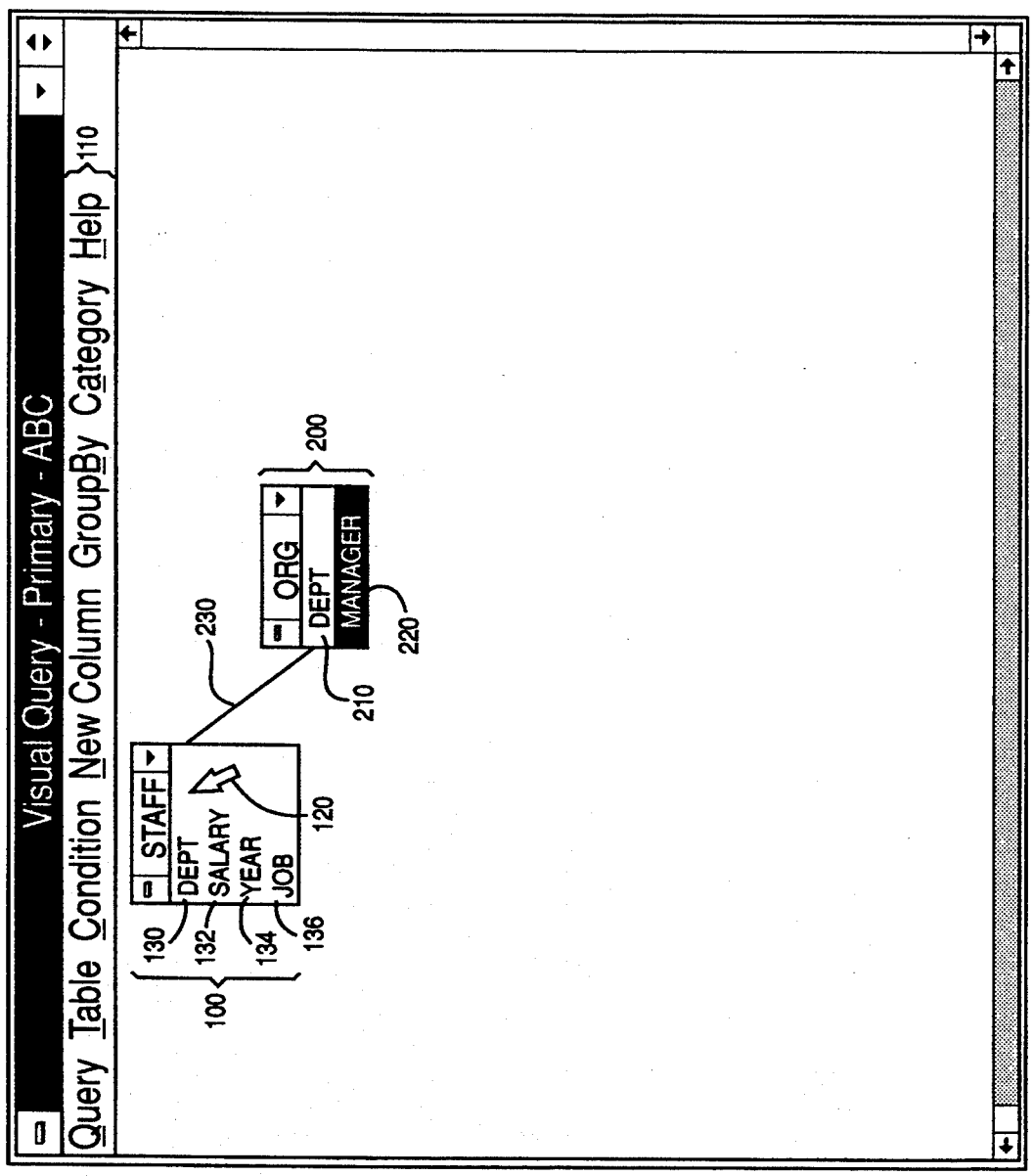
FIG. 8 illustrates a graphic display of a SQL query in accordance with the subject invention.

FIG. 8 depicts a graphical display of a pair of table windows 100 and 200. The action bar 110 has a variety of actions that are user selectable using a mouse. A cursor 120 is used to select actions or objects such as DEPT SALARY 132, YEAR 134 and JOB 136. The objects are arranged in column order of a table similar to their relationship in the SQL definition. The data structure corresponding to the SQL definition is shown in FIG. 4 at 400. The flag column 410 corresponds to the status of the columns. If the particular object is selected via mouse button press, then the object is ON. Thus, DEPT 415 is ON.

The two windows 100 and 200 are joined as shown by the diagonal line between them at 230. The join operation is tracked in the data structure appearing in FIG. 4 at 420. The data structure has two records 422 table name concatenated with column name, and 424 with a record containing another table name concatenated with column name.

FIG. 8 also depicts a selected object MANAGER 220 which is depicted in reverse-video to clearly convey to the user the selection. FIG. 4 contains the corresponding data structure 450 with a column entry 452 corresponding to the object MANAGER and a flag entry 454 corresponding to the selection of the object.

Figure 9:
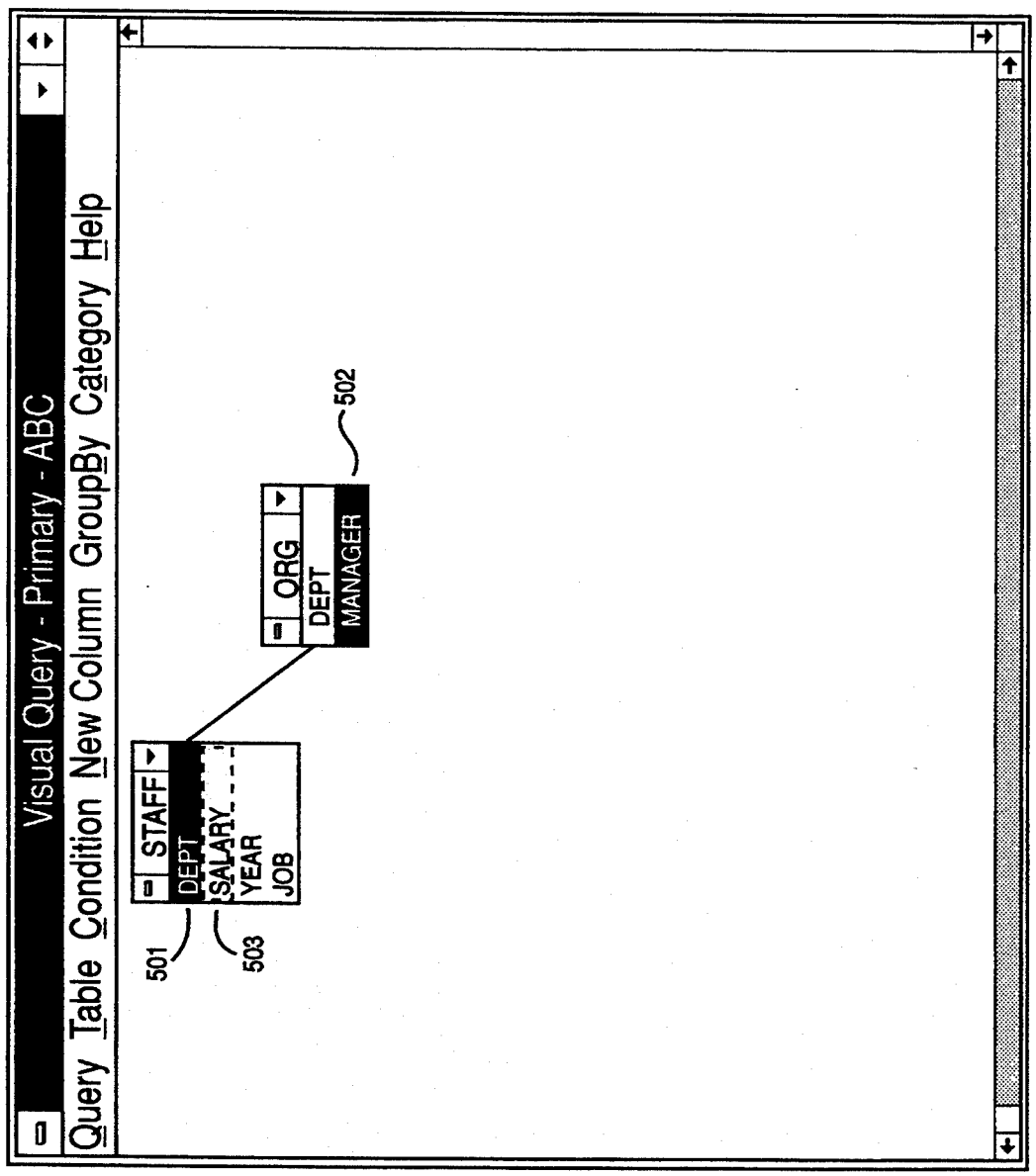
FIG. 9 illustrates a graphic display of a SQL query with a pair of selected objects in accordance with the subject invention.

FIG. 9 depicts two objects selected 501 DEPT and 502 MANAGER. The two objects are reverse-video to clearly convey their select status. Then, when the user places the cursor over the object SALARY 503 and double-clicks the mouse button, the Condition Definition Dialog window appears as depicted at 510 in FIG. 10. The object SALARY 503 automatically appears as the label field 512. The scrollable list box 514 has the selectable items corresponding to the comparison operation 514 that compares the object to the VALUE 516 or the SUBQUERY 518. Selection of the various values proceeds with the particular comparison operation, and a choice of VALUE 516 or SUBQUERY 518. Finally, the user selects the OK operation 520 to signify that selections are complete and the ROW CONDITION window 521 is invoked as depicted in FIG. 11.

Figure 10:
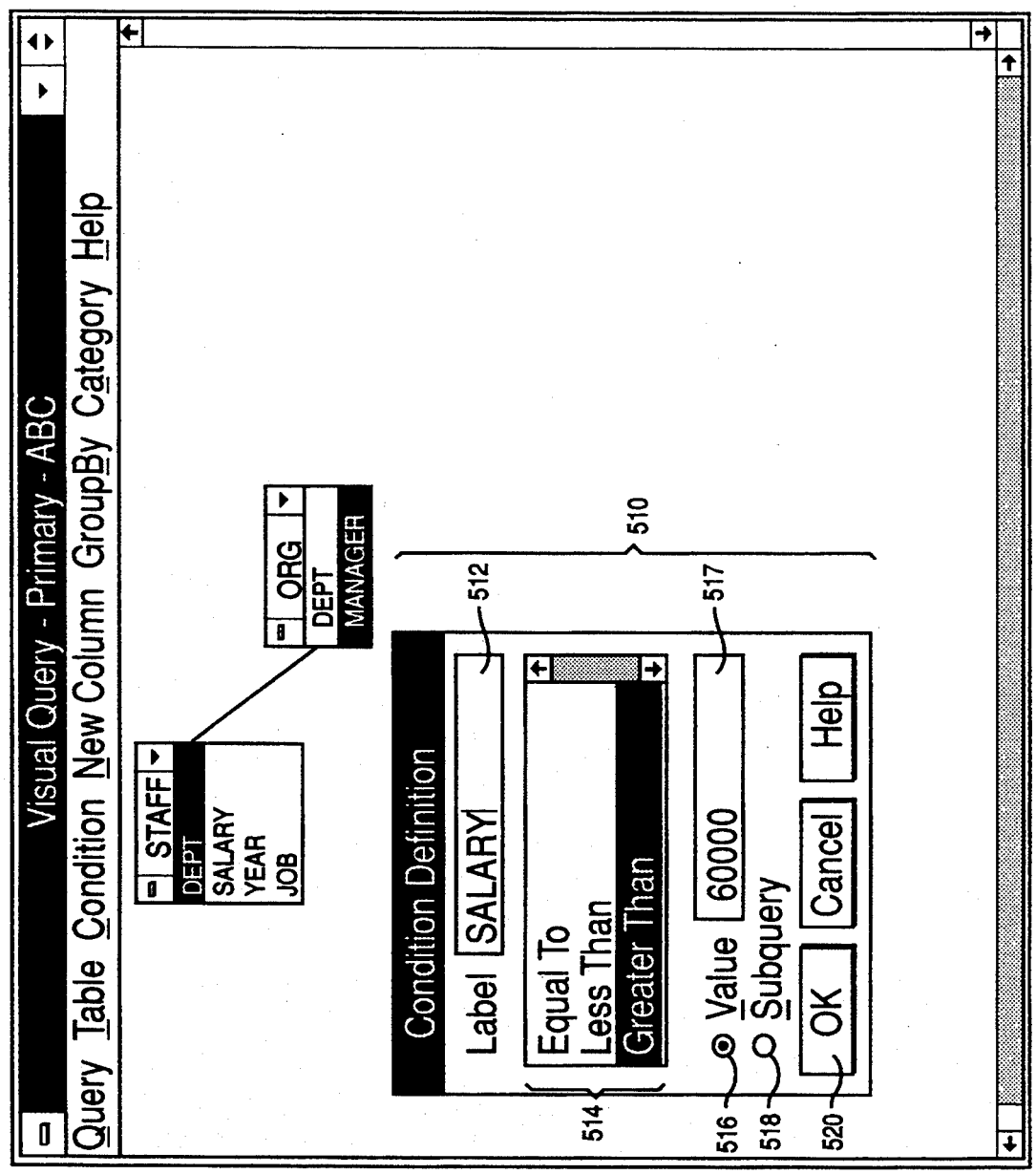
FIG. 10 illustrates a graphic display of a SQL query with a pair of selected objects and a condition definition window in accordance with the subject invention.
Figure 11:
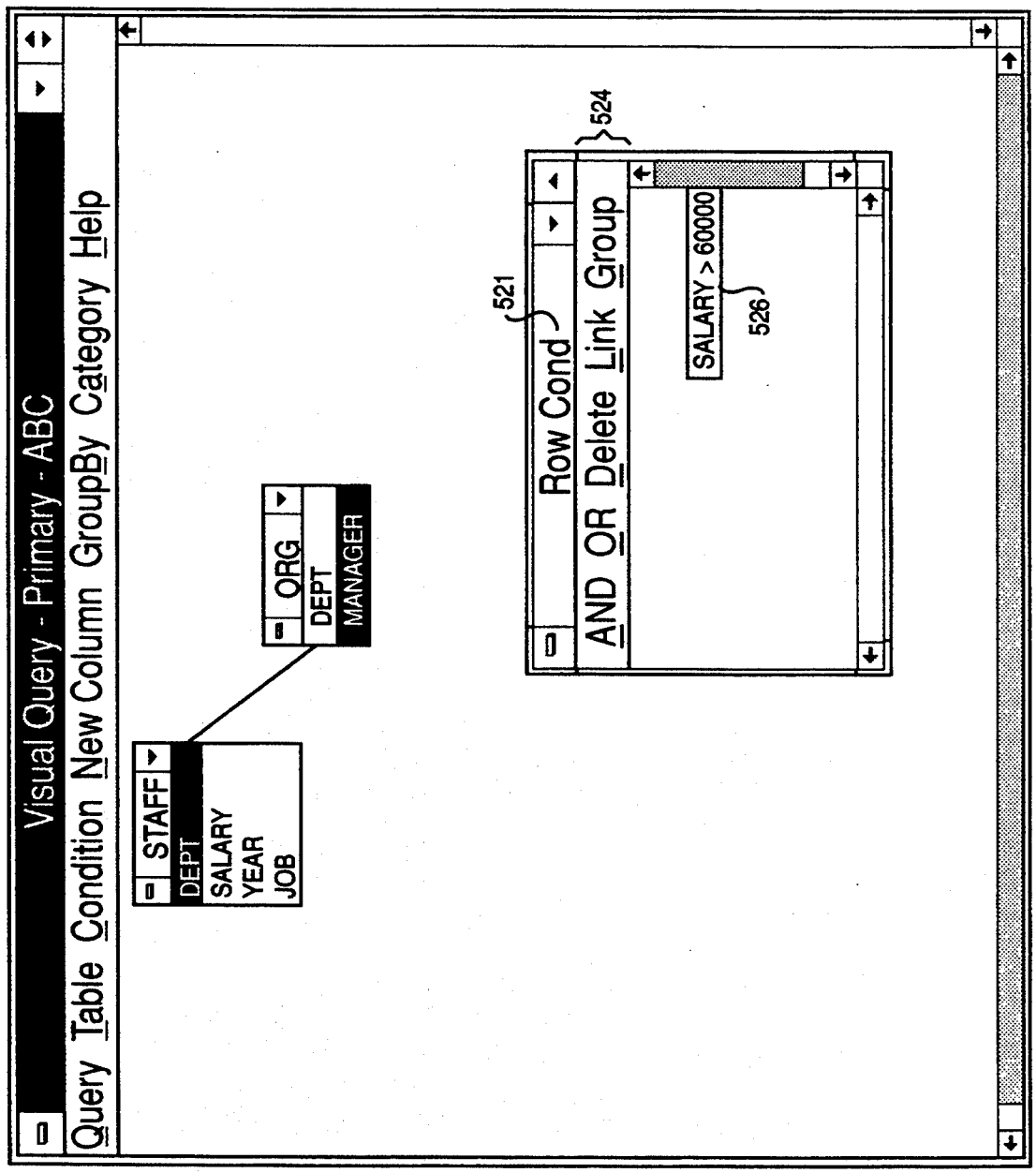
FIG. 11 illustrates a graphic display of a SQL query with a pain of selected objects and a row condition window in accordance with the subject invention.

FIG. 11 shows the ROW CONDITION window 521 with an action bar 524 consisting of the various logical actions that can be applied to the predicate(s) 526 or logical operators joining the operations. FIG. 11 has the single predicate SALARY>60,000. This corresponds to a selection of all SALARY values that exceed $60,000. The data structure corresponding to this operation appears in FIG. 4 at 455. The node name 456 N5 corresponds to a particular predicate appearing in the ROW CONDITION window. For example, the predicate labeled 526 corresponds to N5 456. The next entry 457 correspond to the table name concatenated with the column name, in this case STAFF.SALARY. Proceeding left to right, the next entry is the Comparison Operation 458 corresponds to the comparison operation 514 of FIG. 10. Similarly, the next entry Value Button 459 corresponds to the value (ON/OFF) 516 of FIG. 10. In a similar way, the RS_Value 460 corresponds to the value entered in the value box 517 of FIG. 10. Finally, the Subquery Button 462 corresponds to SELECTED/NOT SELECTED of item 518 of FIG. 10 and RS_Subquery 464 corresponds to the item entered if Subquery 518 of FIG. 10 is selected.

The data structure 470 coordinates the location and the type of logical relationship between nodes or that a single predicate appears. The data structure 480 tracks the parent—child relationships between the various nodes. Each parent node 482 can have a plurality of children 484 associated with a particular parent node 482.

Figure 12:
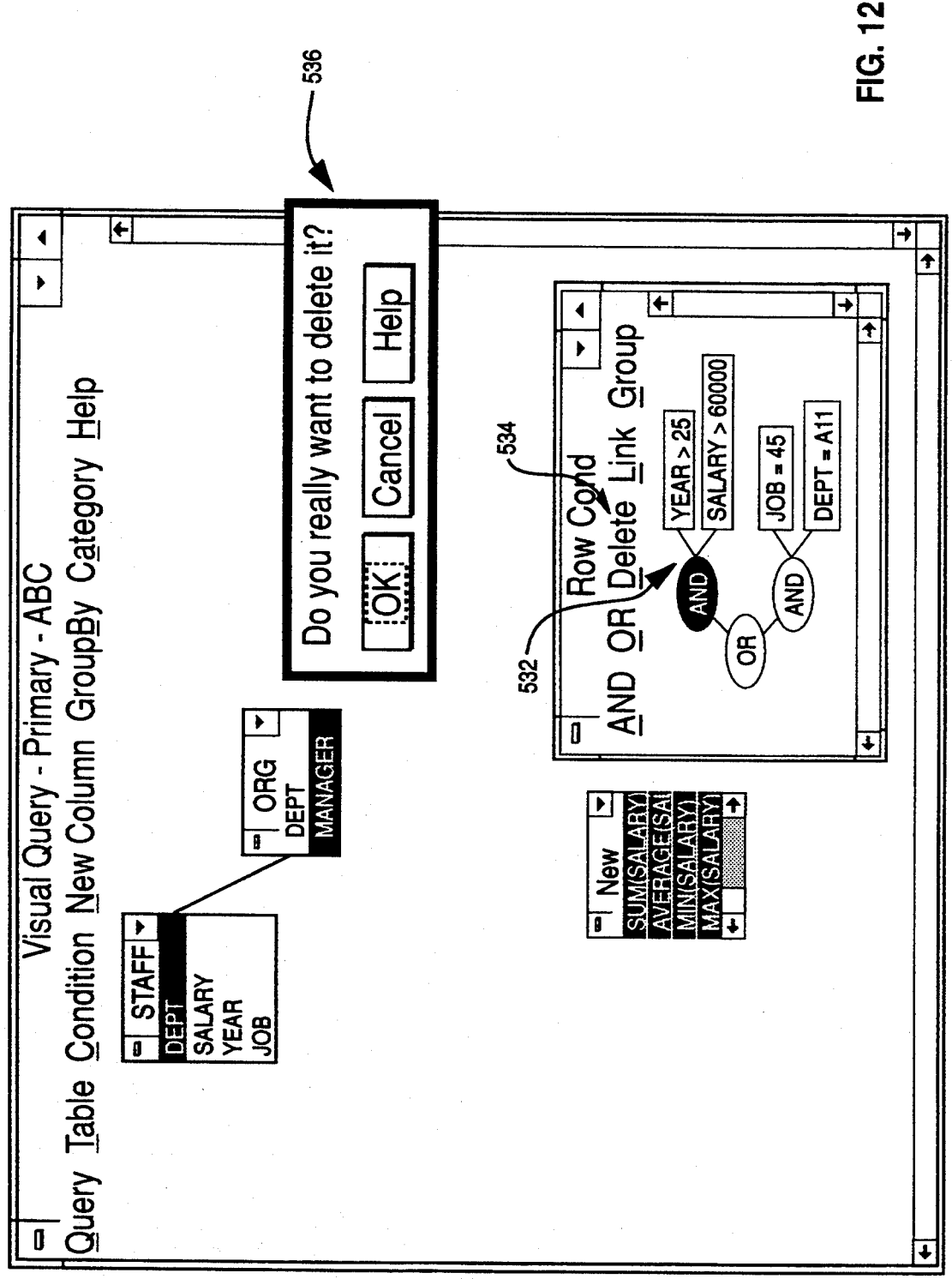
FIG. 12 illustrates a graphic display of a SQL query with a pair of selected objects and a row condition window with a DELETE operation in accordance with the subject invention.
Figure 13:
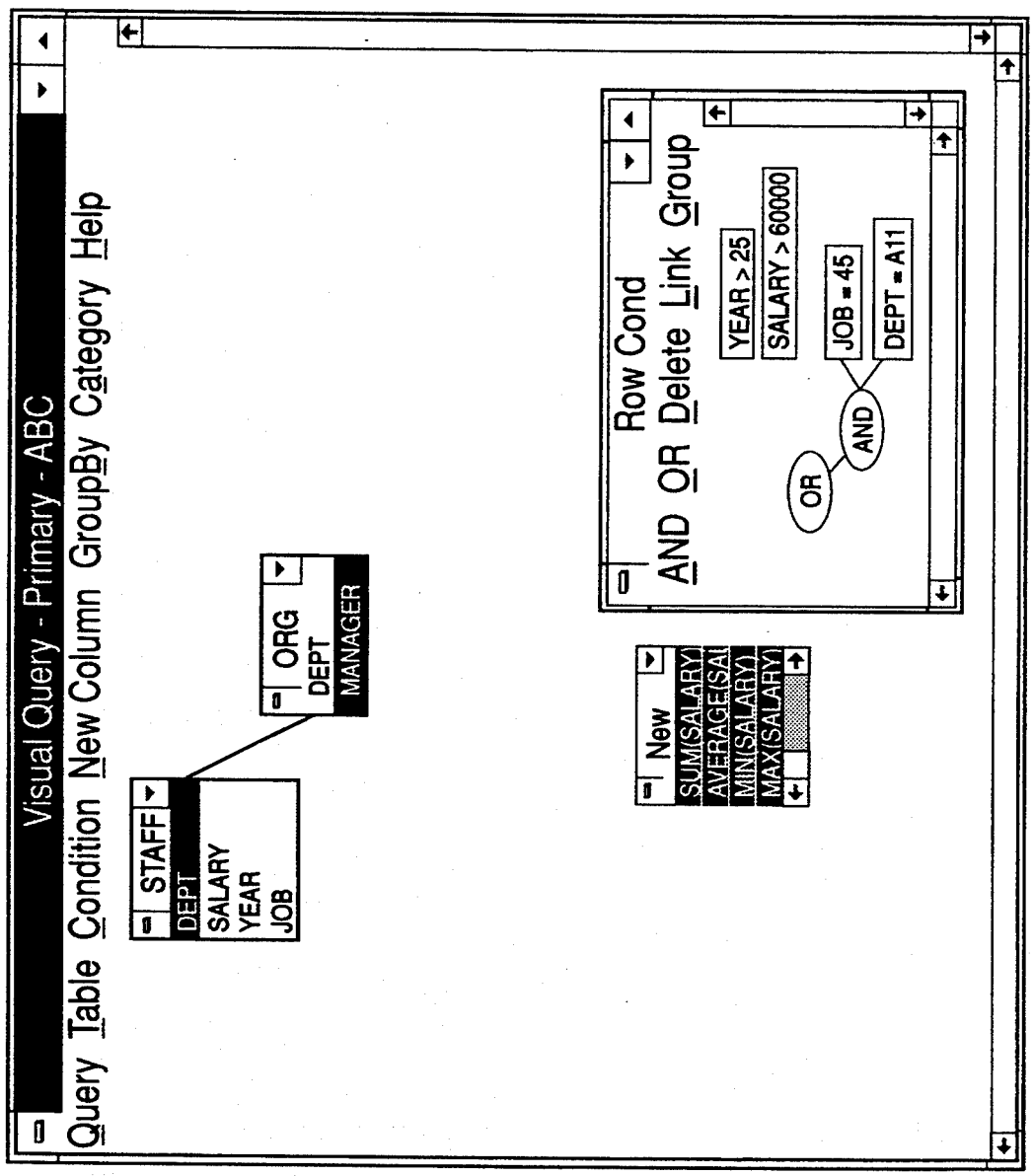
FIG. 13 illustrates a graphic display of a SQL query with a pair of selected objects and a row condition window and a logical operator in accordance with the subject invention.

FIG. 12 is an illustration of a direct manipulation display in accordance with the subject invention. A user can click on the AND node 532 to select it. Thereafter, if the user selects the DELETE option 534, a dialog box 536 appears to prompt the user for confirmation of the DELETE operation. If the user chooses the OK 538, the AND node 532 and its link to the other nodes are all deleted. The corresponding entry in the data structure W_NodelocType 470 of FIG. 4 corresponding to the AND node 532 is also deleted. The entry in data structure W_PARENTCHILDREN 480 of FIG. 4 with PARENTNODE 482 corresponding to AND node 532 is deleted as well. Finally, any entry in data structure W_PARENTCHILDREN 480 of FIG. 4 with AND node 532 in its CHILDRENNodes list is deleted. To the user, all of this activity is transparent and the display illustrated in FIG. 13 is presented to portray the result of the processing.

Figure 14:
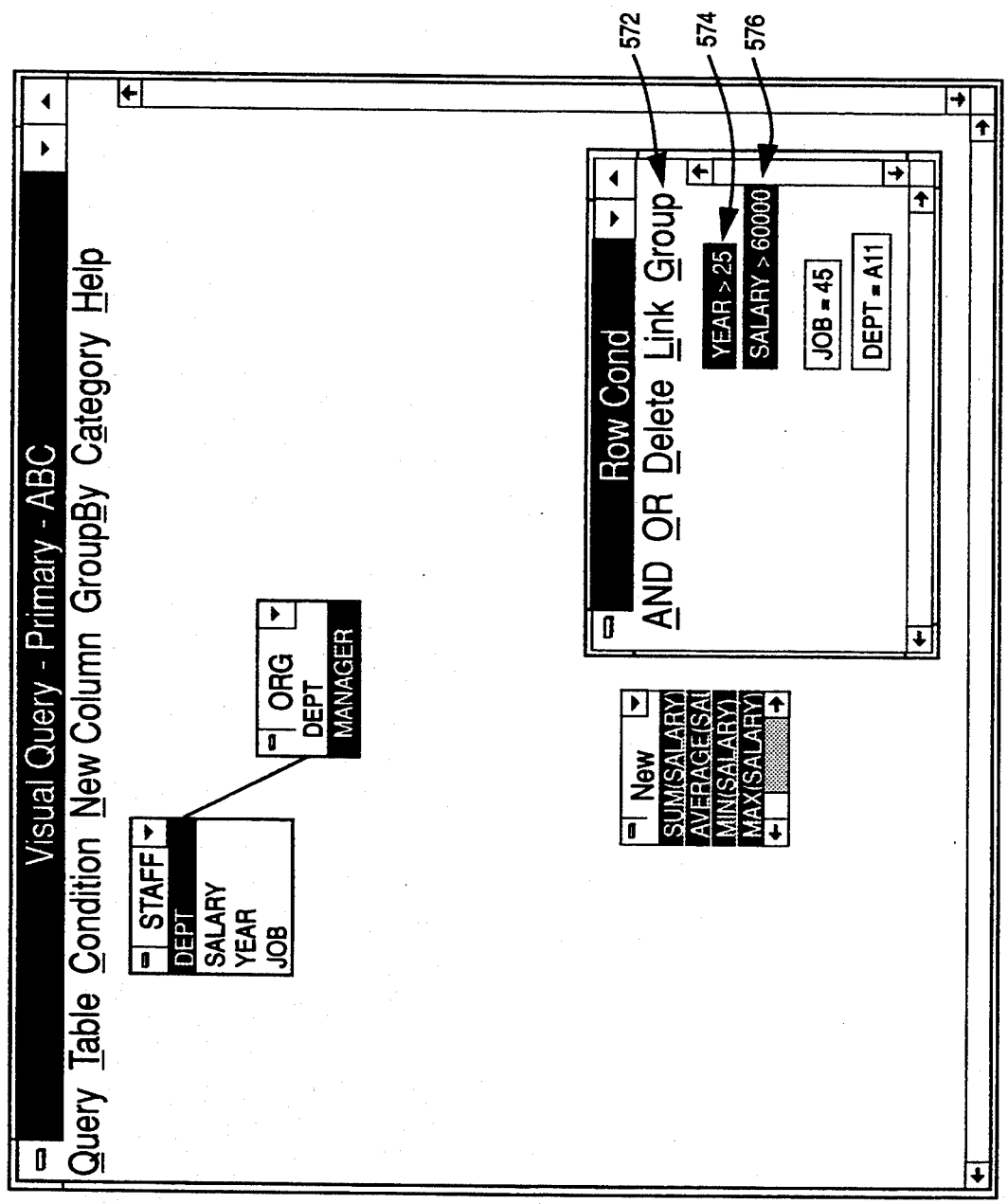
FIG. 14 illustrates a graphic display of a SQL query with a pair of selected objects and a row condition window with a pain of selected conditions in accordance with the subject invention.
Figure 15:
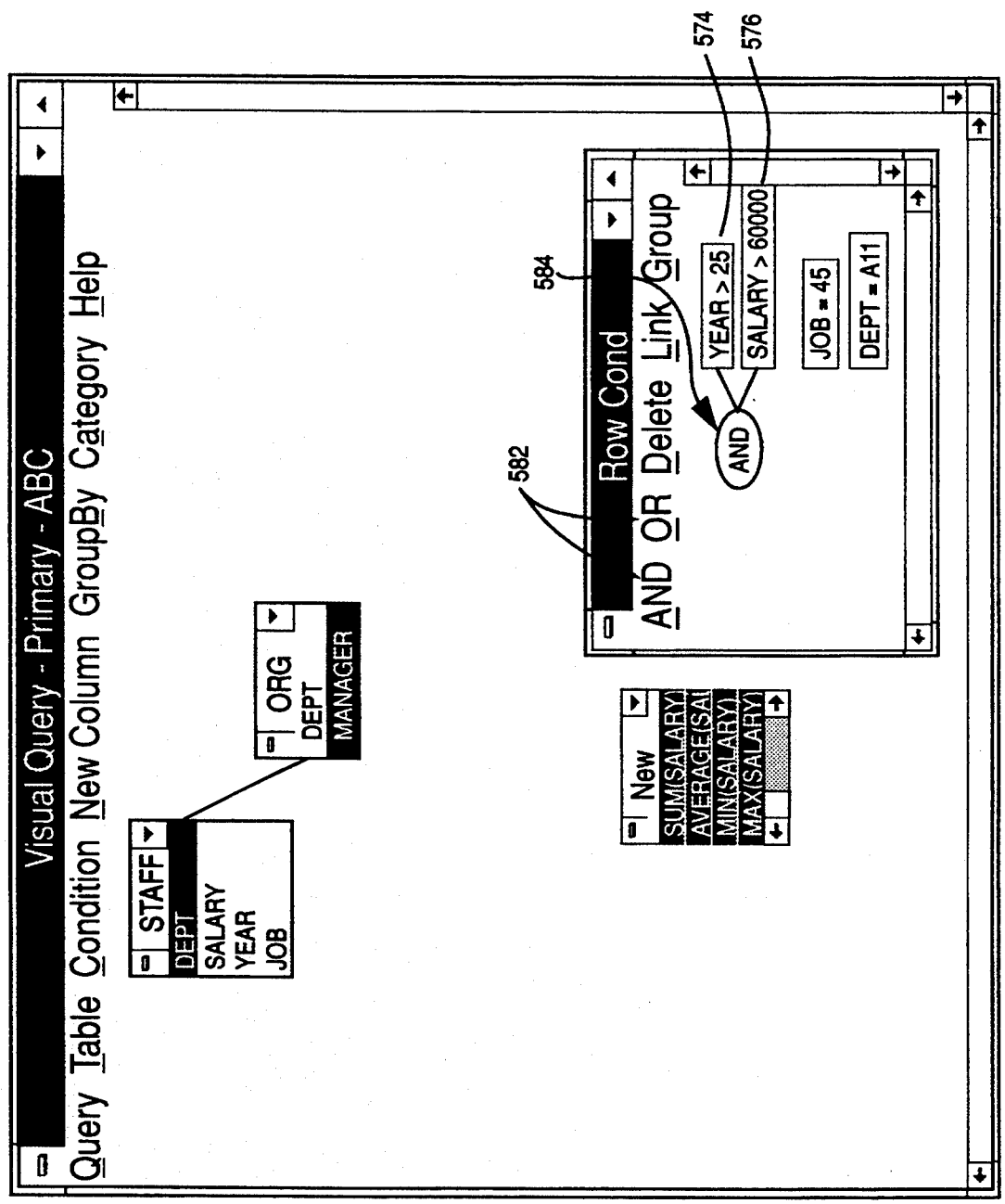
FIG. 15 illustrates a graphic display of a SQL query with a pair of selected objects and a row condition window with a pair Of selected conditions logically linked by an AND operation in accordance with the subject invention.

To rebuild a logical relationship for linking a predicate, a user selects the Group Action 572 of FIG. 14. Then, the user selects the nodes (predicates or logical operators) to group together. In this example, YEAR>25 574 and SALARY>60000 576 are selected. To reflect the selection process, the two entries are reverse-videoed as shown at 574 and 576 of FIG. 14. After selecting all of the nodes that are grouped together, the user selects AND 582 of FIG. 15 in the action bar to link all the selected predicates via an AND operation. Then, an AND node 584 is added to the display with its associated link lines for the selected predicates. The predicates are restored to their normal state with the logical operator joining the predicates reflected via line linkages. A new entry is added to data structure W_NODELOCTYPE 470 of FIG. 4. Also, a new entry indicating the parent—child relationship between AND node 584 and predicate YEAR>25 574, predicate SALARY>60000 576 is added to data structure W_PARENTCHILDREN 480 of FIG. 4. Similarly, the logical operators can be changed, added or deleted through modifications to the associated data structures. The user is always isolated from the internal changes and only focuses on the displayed, graphical representation of the internal processing.

Flow Diagrams of the Detailed Logic

Figure 16:
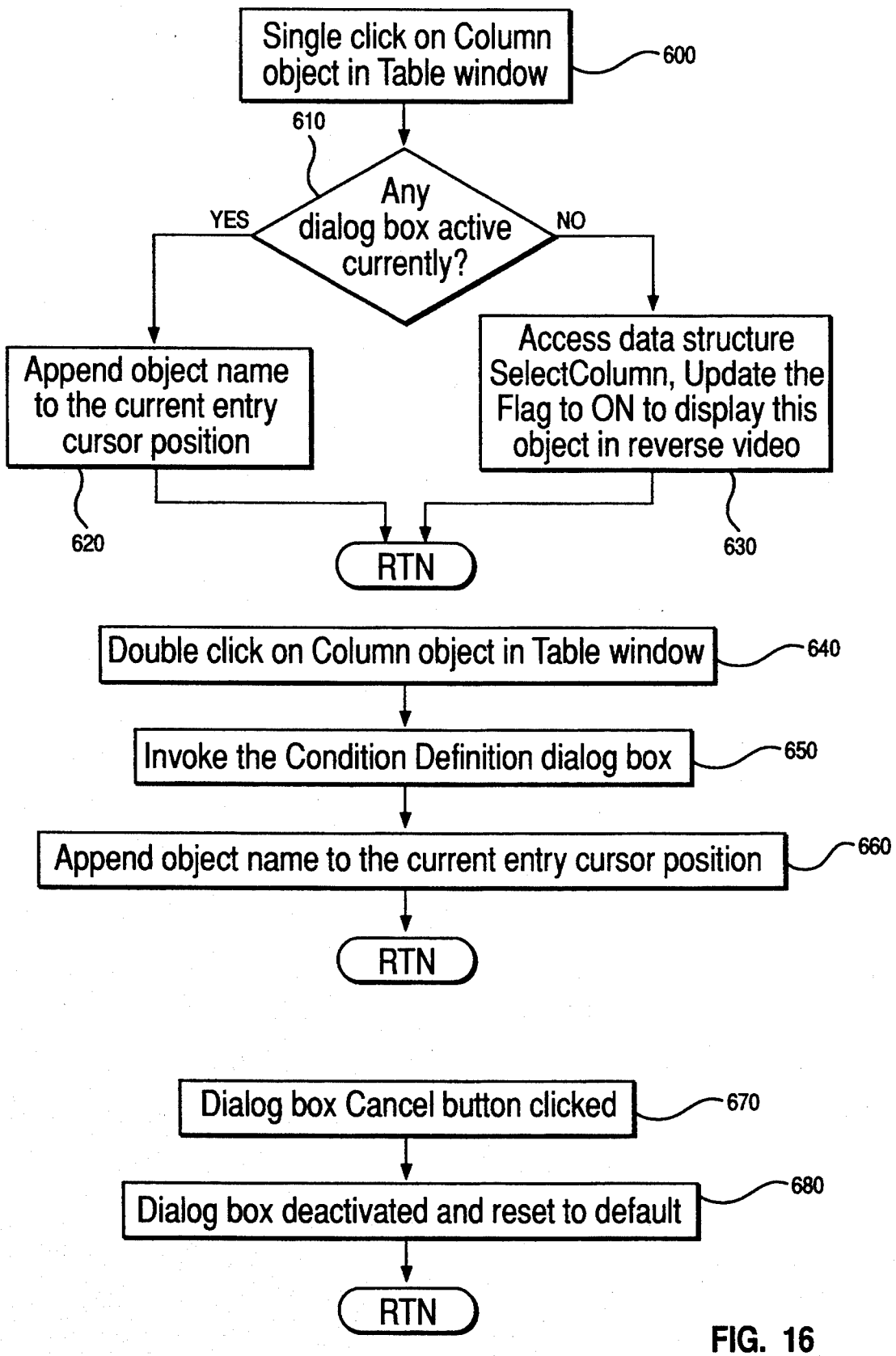
FIG. 16 is a flow diagram of the detailed logic in accordance with the subject invention.

FIGS. 16 to 20 present the detailed logic of the query processing and display system in accordance with the subject invention. In FIG. 16, a user selects a column object by clicking in the Table window as shown in function block 600. If a dialog box is active in decision block 610, then the object name is appended to the current entry cursor position as shown in function block 620. If there is no active dialog box, then the appropriate data structure is accessed and a flag is set to subsequently result in the object being displayed in reverse video as function block 630 points out.

Alternatively, if a user double clicks on a column object in the Table window as detected in function block 640, then the Condition Definition dialog box is invoked in function block 650, and the object name is appended to the current entry cursor position as shown in function block 660. If the dialog box cancel button is pressed as shown in function block 670, then control is passed to function block 680 and the dialog box is deactivated and reset to a default value.

Figure 17:
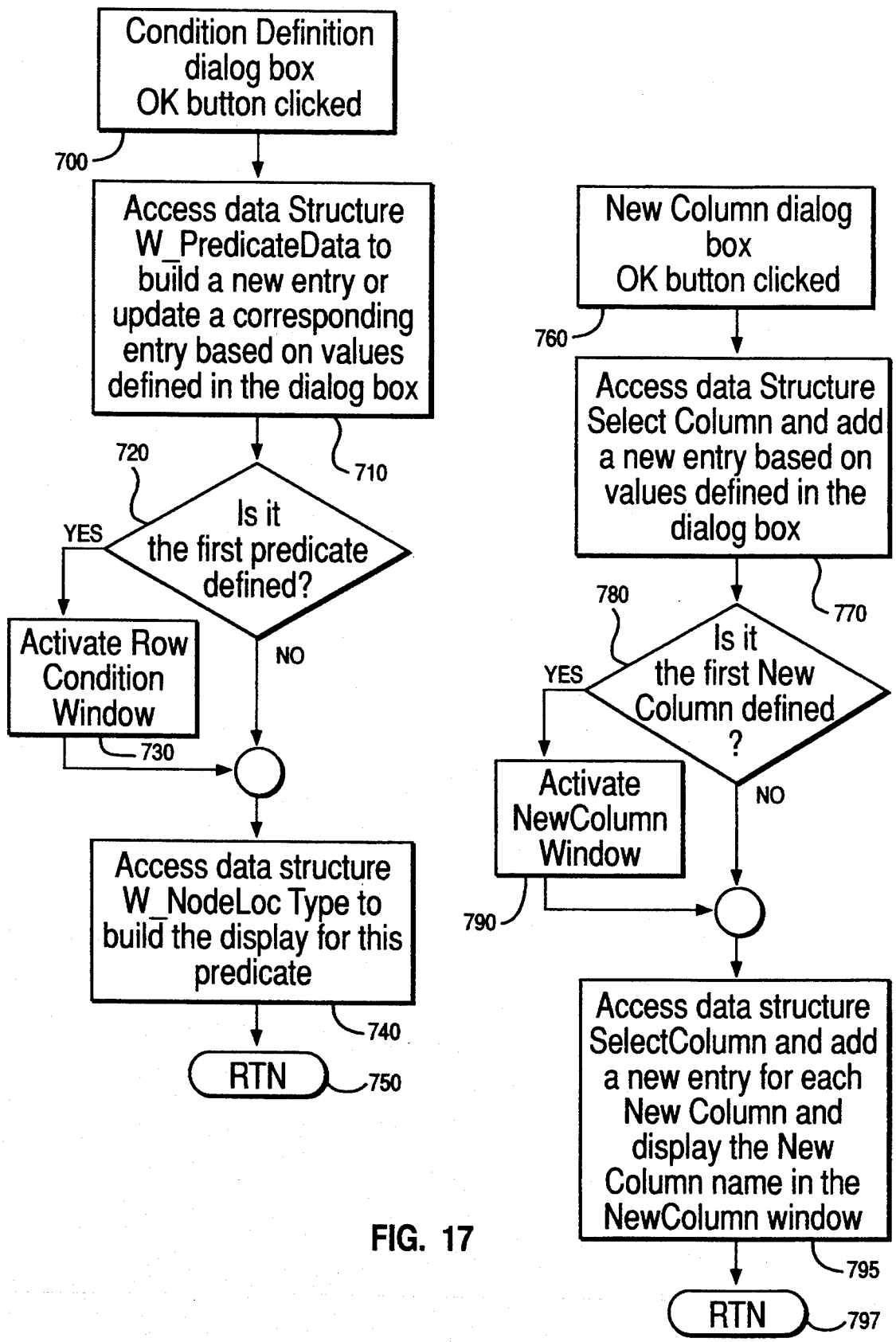
FIG. 17 is a flow diagram of the detailed logic in accordance with the subject invention.

FIG. 17 presents the detailed flow diagram of the OK logic for condition definition processing in accordance with the subject invention. Processing commences at function block 700 when the OK button is clicked to signify selection. Control passes from detection to function block 710 where a new entry is built in the appropriate data structure based on the values previously defined in the dialog box. Then, at decision block 720, a test is performed to determine if it is the first defined predicate. If the predicate is defined, then the row condition window is activated as shown in function block 730 and control passes to function block 740 where the appropriate data structure is accessed to build the display for the predicate. If it is not the first defined predicate, then control also passes directly to function block 740.

The new column dialog box OK logic commences at function block 760 where the OK button press is detected and control is passed to function block 770 where a new entry is added to an appropriate data structure. Then, a test is performed at decision block 780 to determine if this is the first new column definition. If it is, then function block 790 activates the NewColumn Window and a new entry is added to the appropriate data structure as shown in function block 795.

Figure 18:
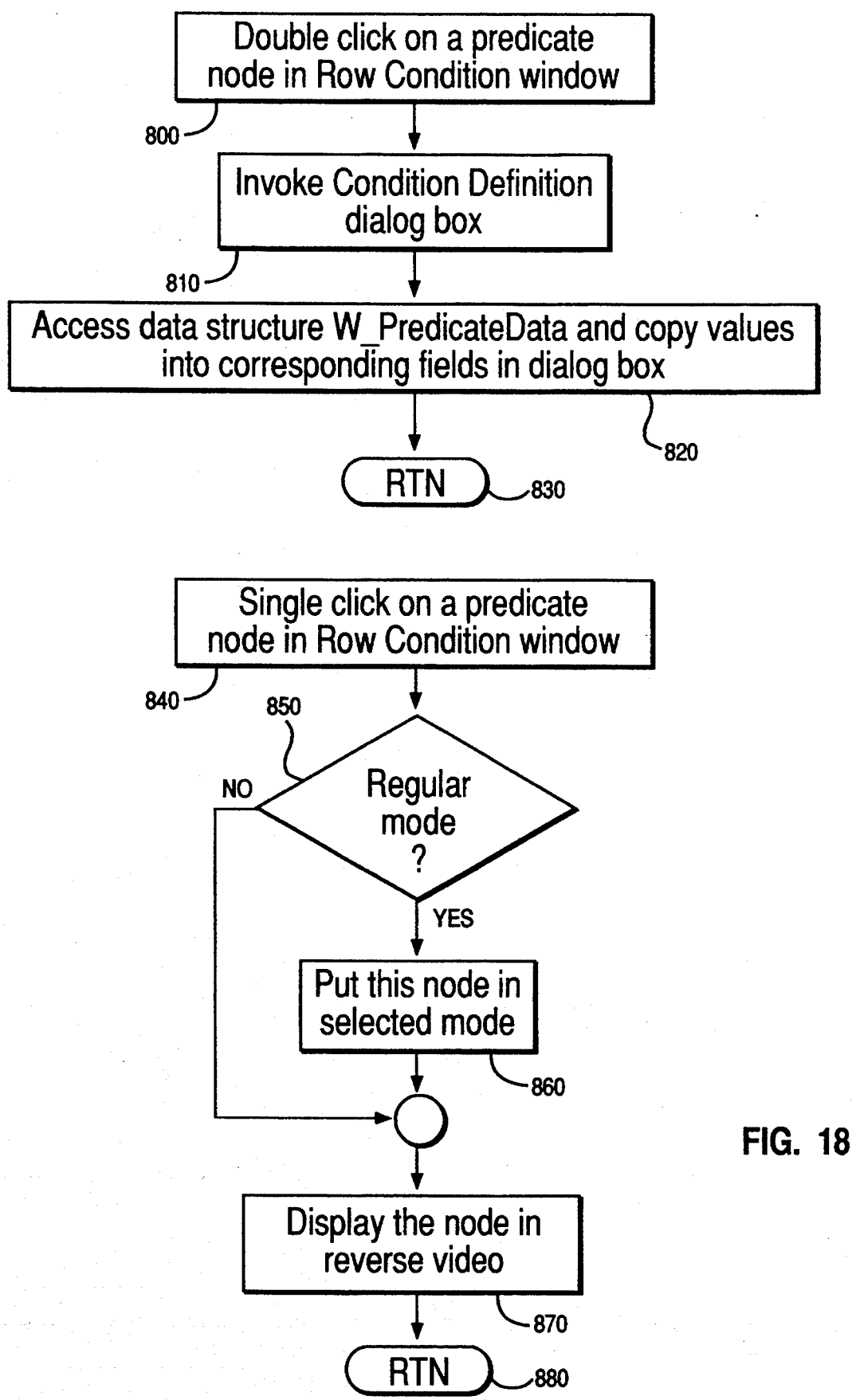
FIG. 18 is a flow diagram of the detailed logic in accordance with the subject invention.

FIG. 18 presents the detailed logic associated with selecting a predicate node and automatically passing the values associated with the predicate node to a dialog box in accordance with the subject invention, Control commences at function block 800 where a predicate node is double clicked on to invoke a condition block as set forth in function block 810. Then, the appropriate data structure is accessed in function block 820 and values are copied into the fields of the dialog box associated with the predicate that was selected. The logic for selection of a predicate node in a row condition window commences at function block 840 where a single click selection of a predicate is detected. Then, a test is performed in decision block 850 to determine if regular mode is active, If regular mode is active, then function block 860 performs a select operation on the particular predicate, If regular mode is not active, then function block 860 is bypassed. Regardless, the selected predicate is displayed in reverse video as shown in function block 870.

FIG. 19 sets forth the logic associated with selecting a logical operator and grouping actions together. To select a logical operator, processing commences at function block 900 where a single click on a logical operator is detected. A test commences immediately to determine what the current mode is at decision block 910. If the mode is regular, then the node is placed in select mode as shown in function block 920 and control is passed to function block 950 where the node is displayed in reverse video, If the mode is Link, then the appropriate data structure is accessed and updated to reflect a new link as shown in function block 930. If the mode is Group, then control is passed to the display function of function block 950. If the mode is selected, then a previously selected node is reset to regular mode as reflected in function block 940. Finally, if a group action is chosen as shown in function block 970, then a Group mode is invoked which disables all other modes as shown in function block 980.

FIG. 20 is a block diagram of the AND, OR and Link processing in accordance with the subject invention. Processing commences at function block 1000 if an AND or an OR action is selected. Then, a test is performed at decision block 1010 to determine what the current mode is. If Group mode is active, then the appropriate data structures are accessed, entries are added and the link is displayed via a line joining the linked objects as shown in function block 1020 and 1040. If Select mode is detected at decision block 1030, then the appropriate data structure is updated and the display is changed to present the selected node in its new type for the user in function blocks 1050 and 1060. Regardless of which mode is selected, processing completes by resetting the mode to regular in function block 1070. Finally, if a Link action is selected in function block 1090, then a test is performed to determine if the Select mode is active. If Select mode is active, then Link mode is invoked and all other active modes ape disabled.

While the invention has been described in terms of a preferred embodiment in a specific system environment, those skilled in the apt recognize that the invention can be practiced, with modification, in other and different hardware and software environments within the spirit and scope of the appended claims.

Having thus described our invention, what we claim as new, and desire to secure by Letters patent is:

1. A method of graphically managing a query for extracting data from a first database in a computer system having a display device and user interaction means, the method comprising the steps of:
    displaying a plurality of query object class indicators;
    creating a plurality of query objects by repeatedly selecting a query object class and entering query object data for each of said query objects;
    linking said plurality of query objects by using said user interaction means to repeatedly select a first query object, a second query object and then specify link parameters, thereby creating a link object;
    storing said query objects and said link objects in a second database.

2. The method of claim 1, further comprising the steps of:
    accepting a query specified in text;
    parsing said text query into a plurality of query objects and link objects;
    storing said query objects and link objects in said second database; and
    displaying said query objects and said link objects on said display device.

3. The method of claim 2, wherein said first and second databases are relational databases.

4. The method of claim 1, wherein said query follows the syntax of an SQL query.

5. The method of claim 4, wherein said first and second databases are relational databases.

6. The method of claim 1, wherein said first and second databases are relational databases.

7. A system for graphically manipulating a query of data stored in a first database, said system operating in conjunction with a processor and display device, the system comprising:
    means for displaying a list of query object classes;
    user interaction means for selecting one of said plurality of query object classes and entering query object data to create a query object;
    selection means for selecting two query objects to be linked and for specifying link information creating a link object;
    first storage means for storing query object definitions and link object definitions.

8. The system of claim 7, further comprising:
    second storage means for storing a character based query;
    parse means for parsing said character based query into query objects and link objects; and
    display means for displaying said query objects and link objects for further manipulation.

9. The system of claim 7, wherein said character based query is comprised of statements satisfying SQL syntax rules.

10. The system of claim 9, wherein the first database and first storage means are relational databases.

11. A method of converting a character based SQL query into a graphical representation of said query that can be manipulated on a display device and stored alternatively in said graphical representation or in modified character based form, the method comprising the steps of:

receiving said character based SQL query;

parsing said query into query objects linked by link objects;

displaying said query objects and said link objects on said display device;

receiving changes to said displayed query objects and link objects;

receiving requests to create new query objects and new link objects linking query objects;

storing said query objects and link objects in a database.

12. The method of claim 11 wherein the database is a relational database and said query objects and link objects are elements of tables in said relational database.

* * * * *

UNITED STATES PATENT AND TRADEMARK OFFICE
CERTIFICATE OF CORRECTION

PATENT NO. : 5,421,008 BEST AVAILABLE COPY Page 1 of 2
DATED : May 30, 1995
INVENTOR(S) : Kenneth R. Banning, Wendy S. James and Shih-Jong Li It is certified that error appears in the above-indentified patent and that said Letters Patent is hereby corrected as shown below:

Col. 1, line 19, delete "duping" and insert --during--;
       line 32, delete "fop" and insert --for--.
Col. 3, line 2, delete "pain" and insert --pair--;
       line 14 delete "pain" and insert --pair--;
       line 18, delete "Of" and insert --of--.
Col. 4 line 14, after 'described' insert --in--.
Col. 5 line 21, delete "(SQL," and insert --,SQL--.
       line 51, delete "fop" and insert --for--;
Col. 6, line 30, delete 'fop' and insert --for--
       line 34, delete "dows," and insert --down,--.
Col. 7 line 1 after '))' insert --.--
Col. 11 line 46 delete 'environment' and insert --environment.--;
Cols. 12-13, all text appear in these columns before the pseudocode begins is a duplication of the previous paragraphs. Please delete all text appearing in these columns up to the point where the pseudocode begins;

UNITED STATES PATENT AND TRADEMARK OFFICE
CERTIFICATE OF CORRECTION

PATENT NO. : 5,421,008  
DATED : May 30, 1995  
INVENTOR(S) : Kenneth R. Banning, Wendy S. James and Shih-Jong Li It is certified that error appears in the above-indentified patent and that said Letters Patent is hereby corrected as shown below:

Cols. 27-28, the text beginning with "Particular" and being double-spaced and ending with "parsing of eq" is a duplication of the first paragraph of regular text immediate following this error, please delete the double-spaced duplicate paragraph.

Col. 31, line 15 delete "invention," insert --invention--.

Col. 31, line 5, delete "art" and insert --art-- and

Signed and Sealed this

Tenth Day of September, 1996

Attest:

BRUCE LEHMAN

Attesting Officer   Commissioner of Patents and Trademarks